(12) United States Patent
Zhu et al.

(10) Patent No.: US 12,461,400 B2
(45) Date of Patent: Nov. 4, 2025

(54) ELECTRO-OPTIC MODULATOR AND METHOD OF FORMING THE SAME

(71) Applicant: AGENCY FOR SCIENCE, TECHNOLOGY AND RESEARCH, Singapore (SG)

(72) Inventors: Shiyang Zhu, Singapore (SG); Qize Zhong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 313 days.

(21) Appl. No.: 18/041,913

(22) PCT Filed: Jun. 25, 2021

(86) PCT No.: PCT/SG2021/050372
§ 371 (c)(1),
(2) Date: Feb. 16, 2023

(87) PCT Pub. No.: WO2022/039670
PCT Pub. Date: Feb. 24, 2022

(65) Prior Publication Data
US 2023/0333418 A1  Oct. 19, 2023

(30) Foreign Application Priority Data
Aug. 21, 2020 (SG) .............. 10202008062V

(51) Int. Cl.
*G02F 1/035* (2006.01)
*G02F 1/21* (2006.01)

(52) U.S. Cl.
CPC .............. *G02F 1/035* (2013.01); *G02F 1/212* (2021.01)

(58) Field of Classification Search
CPC ................. G02F 1/035; G02F 1/212
See application file for complete search history.

(56) References Cited

U.S. PATENT DOCUMENTS 3,813,142 A * 5/1974 Buhrer .................. G02F 1/2955
359/254
4,008,947 A  2/1977 Baues et al.
(Continued)

FOREIGN PATENT DOCUMENTS

CN  107065233 A  8/2017

OTHER PUBLICATIONS

Zhu et al.; "Designs of Silicon Metal-Insulator-Semiconductor Phase Modulator with a Deposited AlN Film as the Gate Dielectric"; IEEE Photonics Technology Letters; vol. 27 No. 11; Jun. 2015; 6 pages.
(Continued)

*Primary Examiner* — Rhonda S Peace
(74) *Attorney, Agent, or Firm* — BakerHostetler

(57) ABSTRACT

Various embodiments may relate to an electro-optic modulator. The electro-optic modulator may include a waveguide configured to carry optical light along a longitudinal length of the waveguide. The electro-optic modulator may also include a first electrically conductive sub-wavelength grating on a first side of the waveguide, the first electrically conductive sub-wavelength grating including a plurality of fingers extending substantially perpendicular to the longitudinal length of the waveguide. The electro-optic modulator may further include a second electrically conductive sub-wavelength grating on a second side of the waveguide opposite the first side, the second electrically conductive sub-wavelength grating including a plurality of fingers extending substantially perpendicular to the longitudinal length of the waveguide. The electro-optic modulator may be configured to modulate the optical light upon application of a potential difference between the first electrically conductive sub-wavelength grating and the second electrically conductive sub-wavelength grating based on Pockels effect.

13 Claims, 19 Drawing Sheets

(56) References Cited

U.S. PATENT DOCUMENTS

| | | | | |
|---|---|---|---|---|
| 5,131,060 | A * | 7/1992 | Sakata | G02F 1/3133 385/9 |
| 6,353,690 | B1 | 3/2002 | Kulishov | |
| 11,385,518 | B2 * | 7/2022 | Krueger | G02B 6/3512 |
| 12,153,294 | B2 * | 11/2024 | Makino | G02F 1/2255 |
| 2020/0064548 | A1 | 2/2020 | Ogawa et al. | |
| 2021/0055581 | A1 * | 2/2021 | Yan | G02F 1/2255 |
| 2023/0333418 | A1 * | 10/2023 | Zhu | G02F 1/035 |
| 2024/0248332 | A1 * | 7/2024 | Zhu | G02F 1/035 |

OTHER PUBLICATIONS

Kim et al.; "Mid-infrared subwavelength modulator based on grating-assisted coupling of a hybrid plasmonic waveguide mode to a graphene plasmon"; Nanoscale; Issue 44, 2017; 6 pages (Abstract Only).

Akiyama et al.; "Compact PIN-Diode-Based Silicon Modulator Using Side-Wall-Grating Waveguide"; IEEE Journal of Selected Topics in Quantum Electronics; vol. 19 No. 6; Nov./Dec. 2013; 11 pages.

Halir et al.; "Waveguide sub-wavelength structures: a review of principles and applications"; Laser & Photonics Reviews; vol. 9; 2015; p. 25-49.

Cheben et al.; "Subwavelength integrated photonics"; Nature; vol. 560; Aug. 2018; p. 565-572.

Zhu et al.; "Aluminum nitride electro-optic phase shifter for backend integration on silicon"; Optic Express; vol. 24; Jun. 2016; p. 12501-12506.

Xiong et al.; "Low-Loss, Silicon Integrated, Aluminum Nitride Photonic Circuits and Their Use for Electro-Optic Signal Processing"; Nano Letters; vol. 12; 2012; p. 3562-3568.

Boes et al.; "Status and Potential of Lithium Niobate on Insulator (LNOI) for Photonic Integrated Circuits"; Laser & Photonics Reviews; 2018; 19 pages.

Wang et al.; "Integrated lithium niobate electro-optic modulators operating at CMOS-compatible voltages"; Nature; vol. 562; Oct. 2018; 12 pages.

Wooten et al.; "A Review of Lithium Niobate Modulators for Fiber-Optic Communications Systems"; IEEE Journal of Selected Topics in Quantum Electronics; vol. 6 No. 1; Jan./Feb. 2000; p. 69-82.

International Patent Application No. PCT/SG2021/050372; Int'l Search Report and Written Opinion; dated Sep. 30, 2021; 7 pages.

* cited by examiner

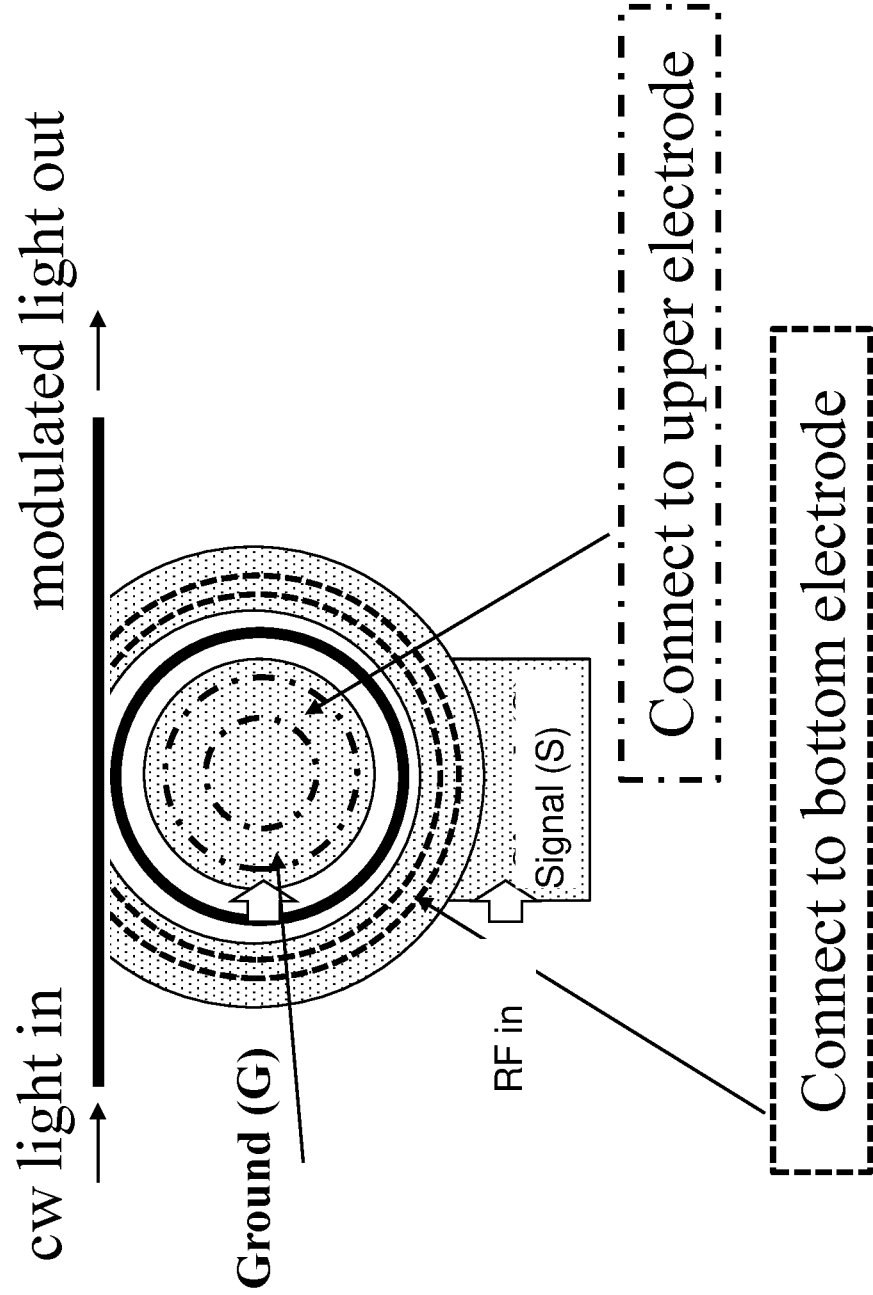

ELECTRO-OPTIC MODULATOR AND METHOD OF FORMING THE SAME

CROSS-REFERENCE TO RELATED APPLICATION

The current application is a 371 national stage application of PCT International Application No. PCT/SG2021/050372 filed Jun. 25, 2021, and claims the benefit of priority of Singapore application No. 10202008062V filed Aug. 21, 2020, the contents of which are hereby incorporated by reference in their entireties for all purposes.

TECHNICAL FIELD

Various embodiments of this disclosure may relate to an electro-optic modulator. Various embodiments of this disclosure may relate to a method of forming an electro-optic modulator.

BACKGROUND

Various electro-optic modulators have been demonstrated based on materials such as silicon, indium phosphide, or polymers, etc. Among them, lithium niobate (LN) is the material of choice for decades because of its relatively large Pockels electro-optic coefficient of about 33 pm/V. Discrete modulators in the market are mostly fabricated on LN. The conventional LN modulators are formed either by proton exchange or by diffusion of titanium, thus leading to low-index contrast waveguides with poor optical confinement, resulting in relatively low modulation efficiency, large size, and difficult integration. Recently, lithium niobate-on-insulator (LNOI) modulators have been developed with significantly improved performance. However, LNOI is very expensive and it is also difficult for monolithic integration on the silicon (Si) platform.

On the other hand, deposited aluminium nitride (AlN) and scandium aluminium nitride (ScAlN) are complementary metal oxide semiconductor (CMOS) compatible materials, and can be monolithically integrated on the Si platform using a CMOS compatible process. AlN modulators have been reported. However, AlN modulators suffer from the very low modulation efficiency (about 200 Vcm) because of its small Pockels coefficient of about 1 pm/V.

SUMMARY

Various embodiments may relate to an electro-optic modulator. The electro-optic modulator may include a waveguide configured to carry optical light along a longitudinal length of the waveguide. The electro-optic modulator may also include a first electrically conductive sub-wavelength grating on a first side of the waveguide, the first electrically conductive sub-wavelength grating including a plurality of fingers extending substantially perpendicular to the longitudinal length of the waveguide. The electro-optic modulator may further include a second electrically conductive sub-wavelength grating on a second side of the waveguide opposite the first side, the second electrically conductive sub-wavelength grating including a plurality of fingers extending substantially perpendicular to the longitudinal length of the waveguide. The electro-optic modulator may be configured to modulate the optical light upon application of a potential difference between the first electrically conductive sub-wavelength grating and the second electrically conductive sub-wavelength grating based on Pockels effect.

Various embodiments may relate to a method of forming an electro-optic modulator. The method may include forming a waveguide configured to carry optical light along a longitudinal length of the waveguide. The method may also include forming a first electrically conductive sub-wavelength grating on or in contact with a first side of the waveguide, the first electrically conductive sub-wavelength grating including a plurality of fingers extending substantially perpendicular to the longitudinal length of the waveguide. The method may further include forming a second electrically conductive sub-wavelength grating on or in contact with a second side of the waveguide opposite the first side, the second electrically conductive sub-wavelength grating including a plurality of fingers extending substantially perpendicular to the longitudinal length of the waveguide. The electro-optic modulator may be configured to modulate the optical light upon application of a potential difference between the first electrically conductive sub-wavelength grating and the second electrically conductive sub-wavelength grating based on Pockels effect.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 10A shows a single-ring ring modulator according to various embodiments.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the modulators or systems are analogously valid for the other modulators or systems. Similarly, embodiments described in the context of a method are analogously valid for a modulator, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/of" includes any and all combinations of one or more of the associated listed items.

Various embodiments may relate to an electrode which can enhance the modulation efficiency of the modulator to be comparable with the efficiency of a commercial LN modulator.

The refractive index of an electro-optic (EO) material is changed by applying an electric field though it, based on following equations:

$$\Delta\left(\frac{1}{n^2}\right)_i = \begin{pmatrix} 0 & 0 & r_{13} \\ 0 & 0 & r_{13} \\ 0 & 0 & r_{33} \\ 0 & r_{51} & 0 \\ r_{51} & 0 & 0 \\ 0 & 0 & 0 \end{pmatrix} \begin{pmatrix} E_x \\ E_y \\ E_z \end{pmatrix} \quad (1)$$

where $r_{13}$, $r_{33}$, and $r_{51}$ are the Pockels coefficients. For LN, $r_{33}$=31 pm/V and $r_{51}$=28 pm/V, and for AlN, $r_{33}$=about 1 pm/V, $r_{51}$<about 0.1 pm/V.

Figure 1:
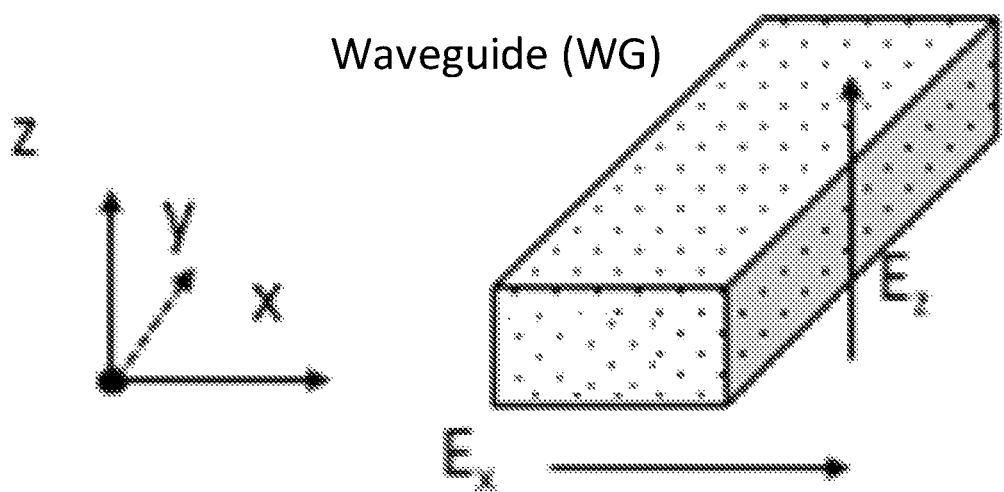
FIG. 1 is a schematic showing a waveguide.

FIG. 1 is a schematic showing a waveguide. For a waveguide shown in FIG. 1, a vertical electric field ($E_z$) and/or horizontal electric field ($E_x$) can be applied. The index change can be expressed as follows:

$$\Delta n = -\left(\frac{1}{2}\right) r_{33} \cdot n^3 \cdot E_z \quad (2)$$

$$\Delta n = -\left(\frac{1}{2}\right) r_{51} \cdot n^3 \cdot E_x \quad (3)$$

The electric field induced by the applied voltage V may be defined as:

$$E = \frac{V}{S} \quad (4)$$

However, if there is a cladding layer such as silicon oxide ($SiO_2$) between the electrode and the waveguide (WG), the field in the waveguide is usually smaller than that in the $SiO_2$ cladding layer, because the waveguide core material usually has larger electric dielectric constant than $SiO_2$. An equivalent S (equivalent separation between electrodes) can be defined as:

$$S = \frac{\varepsilon_{WG}}{\varepsilon_{SiO2}} t_{SiO2} + t_{WG} \quad (5)$$

where $\varepsilon_{SiO2}$ is electric dielectric constant of $SiO_2$, $\varepsilon_{WG}$ is the dielectric constant of the waveguide core, $t_{SiO2}$ is the oxide thickness of the $SiO_2$ cladding, and $t_{WG}$ is the core thickness of the waveguide.

The product of the voltage and length for π-phase shift may be provided by:

$$V_\pi \cdot L_\pi = \frac{\lambda \cdot S}{n^3 \cdot r_{33 \, or \, 51} \cdot \Gamma} \quad (6)$$

where λ is wavelength in free space, Γ is the electro-optic overlap, and S is the equivalent separation between electrodes. A lower $V_\pi \cdot L_\pi$ means the higher modulation efficiency, which requires small S, large $r_{33}$ or $r_{51}$, and large Γ.

Figure 2:
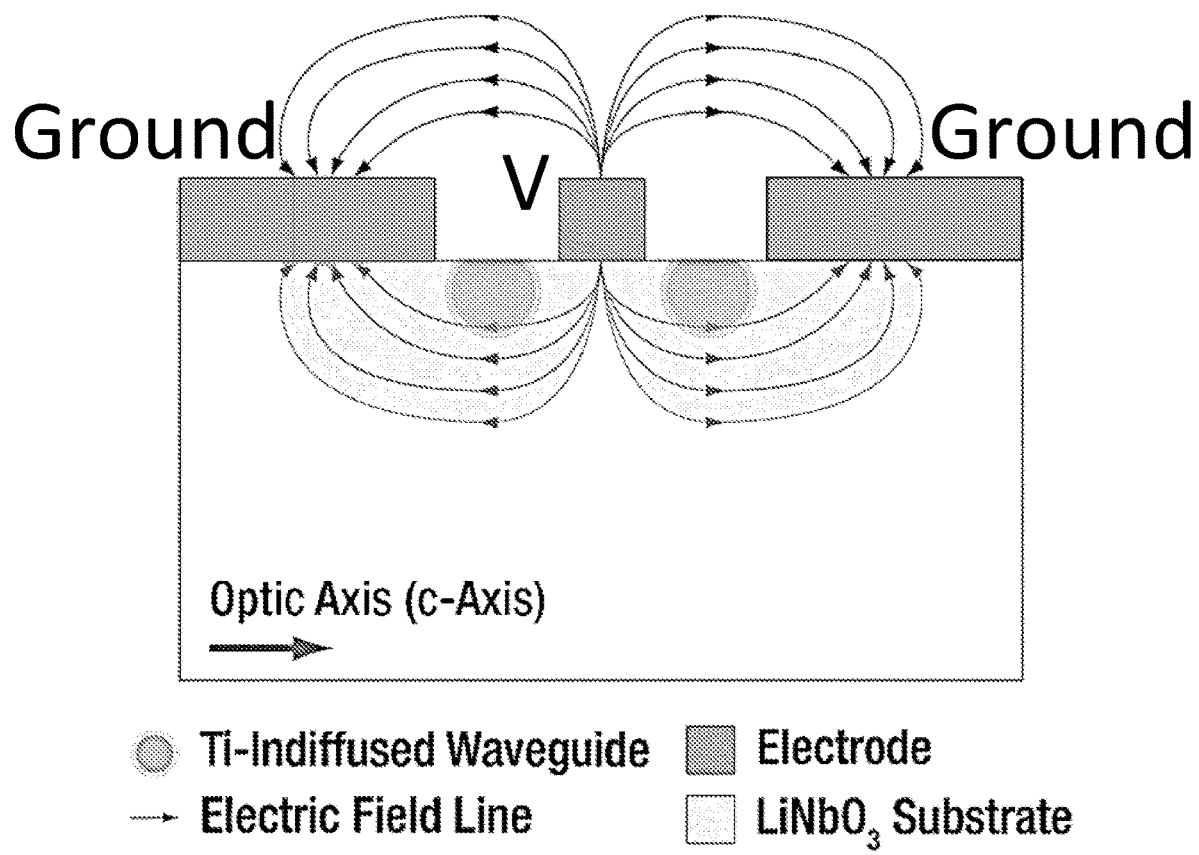
FIG. 2 is a schematic showing the cross section of a lithium niobate (LN) modulator.

FIG. 2 is a schematic showing the cross section of a lithium niobate (LN) modulator. As LN has similar $r_{33}$ and $r_{51}$, the electrode can be placed at the side of the LN waveguide to induce a horizontal electric field through the waveguide. The waveguide is formed by titanium (Ti) indiffusion or proton exchange, thus the refractive index contrast is only about 0.02. As a result, it has very large mode and the distance between the electrode and the waveguide should be larger than about 10 μm to avoid metal induced optical loss, i.e., S should be larger than about 20 μm. Then, Vπ·Lπ is calculated to be larger than 12 V·cm. Actually, the real LN modulators in the market have Vπ·Lπ larger than 10 V·cm.

Figure 3:
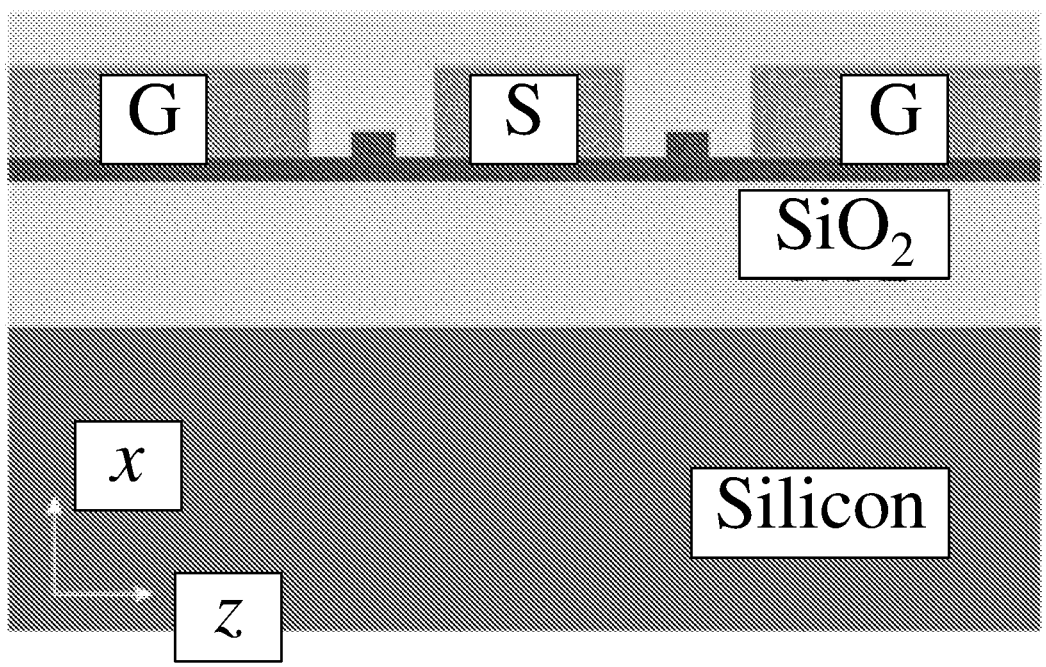
FIG. 3 is a schematic showing the cross section of a lithium niobate-on-insulator (LNOI) modulator.

FIG. 3 is a schematic showing the cross section of a lithium niobate-on-insulator (LNOI) modulator. By etching the LN thin film to form the waveguide, the light can be tightly confined and the electrode can be placed close to the waveguide. However, because LN has much larger dielectric constant than SiO$_2$, the electric field in LN waveguide core may be much smaller than that in SiO$_2$. The equivalent S is calculated to be about 6 µm and V$\pi$·L$\pi$ is calculated to be 2-3 V·cm. However, LNOI wafer is very expensive and it is difficult to be integrated on Si platform with other photonic devices.

Figure 4A:
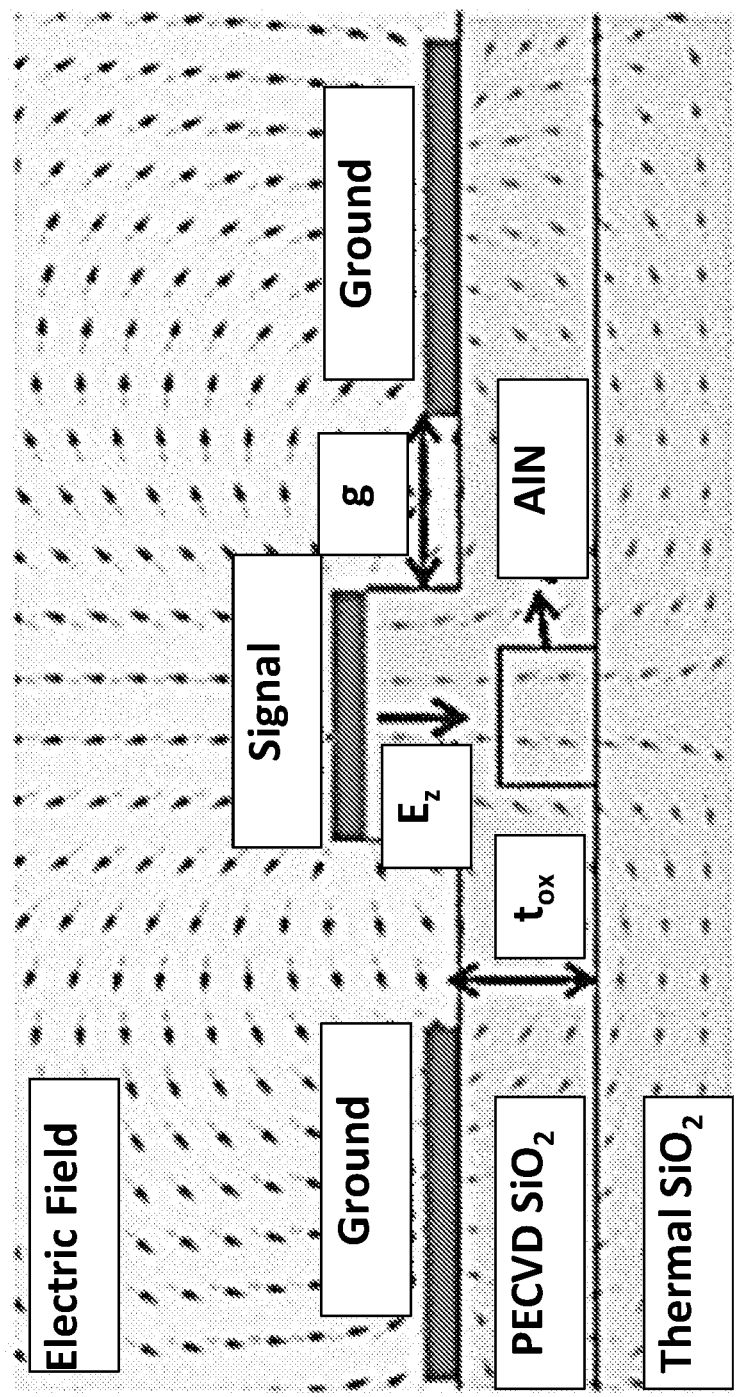
FIG. 4A is a schematic of an aluminium nitride (AlN) modulator in which the ground and signal electrodes are at the top.
Figure 4B:
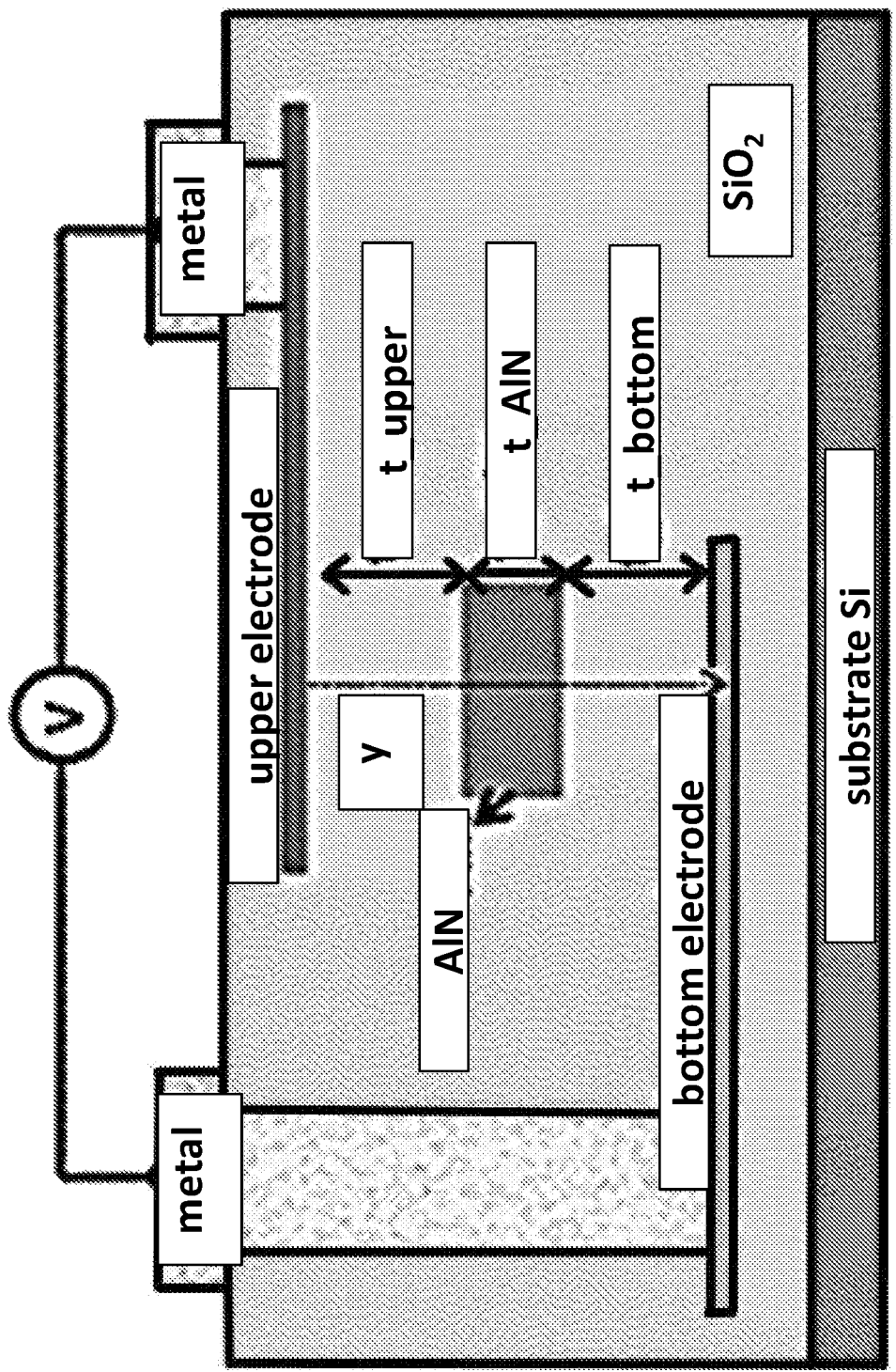
FIG. 4B is a schematic of an aluminium nitride (AlN) modulator with one upper electrode and one bottom electrode.

Aluminium nitride (AlN) is a CMOS compatible material and can be deposited on any substrate. AlN has $r_{51}$ much smaller than $r_{33}$. As such, only vertical electric field $E_z$ can be used to tune the refractive index. FIGS. 4A-B show two reported configurations of AlN electro-optic (EO) modulators. FIG. 4A is a schematic of an aluminium nitride (AlN) modulator in which the ground and signal electrodes are at the top. FIG. 4B is a schematic of an aluminium nitride (AlN) modulator with one upper electrode and one bottom electrode.

In order to avoid electrode induced optical loss, an electrode should be placed at least 1.5 µm away from the AlN waveguide. As AlN has dielectric constant of $\varepsilon_{AlN}$=~10, much larger than that of SiO$_2$ ($\varepsilon_{SiO2}$=3.9), the electric field $E_z$ and the equivalent distance (S) between the electrodes can be estimated as:

$$E_z = \frac{V}{S} = \frac{V}{(t_{upper}+t_{bottom}) \times \frac{\varepsilon_{AlN}}{\varepsilon_{SiO2}} + t_{AlN}} \quad (7)$$

For a typical AlN modulator, thickness of upper electrode ($t_{upper}$)=thickness of bottom electrode ($t_{bottom}$)=1.8 µm, thickness of AlN waveguide ($t_{AlN}$)=1.8 µm and $\varepsilon_{AlN}$=~10, $\varepsilon_{SiO2}$=3.9, the equivalent distance (S) may be calculated to be S=~9.6 µm. Taking into $\Gamma$=71.3% into account, V$_\pi$·L$_\pi$ is calculated to be ~225 V·cm theoretically. Experimentally, AlN modulator has measured to have V$_\pi$·L$_\pi$ of ~240 V·cm.

In order to reduce V$_\pi$·L$_\pi$ one needs to increase $r_{33}$,—which is limited by material property, and/or to reduce equivalent S without affecting the waveguide optical mode. The electrode would need fulfill the following criteria: high transparence, high conductivity, and lower refractive index than that of the waveguide material. However, there is no such material in nature.

Figure 5:
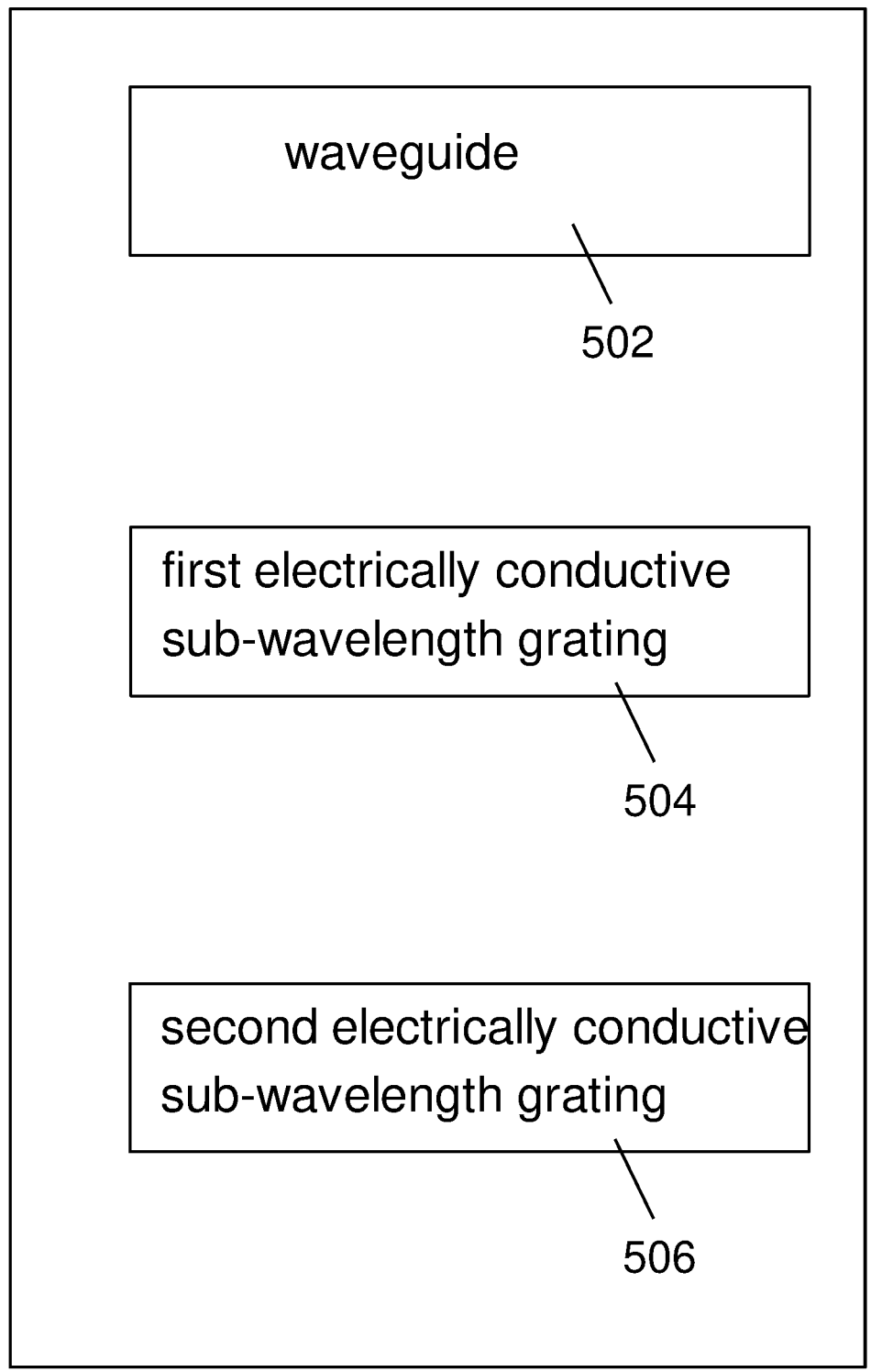
FIG. 5 is a general illustration of an electro-optic modulator according to various embodiments.

Various embodiments may address the abovementioned issues. FIG. 5 is a general illustration of an electro-optic modulator according to various embodiments. The electro-optic modulator may include a waveguide 502 configured to carry optical light along a longitudinal length of the waveguide. The electro-optic modulator may also include a first electrically conductive sub-wavelength grating 504 on or in contact with a first side of the waveguide, the first electrically conductive sub-wavelength grating including a plurality of fingers extending substantially perpendicular to the longitudinal length of the waveguide. The electro-optic modulator may further include a second electrically conductive sub-wavelength grating 506 on or in contact with a second side of the waveguide opposite the first side, the second electrically conductive sub-wavelength grating including a plurality of fingers extending substantially perpendicular to the longitudinal length of the waveguide. The electro-optic modulator may be configured to modulate the optical light upon application of a potential difference between the first electrically conductive sub-wavelength grating 504 and the second electrically conductive sub-wavelength grating 506 based on Pockels effect.

In other words, the modulator may include a waveguide 502, a first electrode 504 and a second electrode 506. The waveguide 502 may be between the first electrode 504 and the second electrode 506. The first electrode 504 may be a first electrically conductive sub-wavelength grating with a plurality of fingers extending substantially perpendicular to the waveguide 502. Likewise, the second electrode 506 may be a second electrically conductive sub-wavelength grating with a plurality of fingers extending substantially perpendicular to the waveguide 502.

For avoidance of doubt, FIG. 5 is a general illustration and serves to illustrate the features according to some embodiments. FIG. 5 is not intended to limit the arrangement, size, shape etc. of the different features.

The longitudinal length of the waveguide may refer to the length of the waveguide. In various embodiments, the first electrically conductive sub-wavelength grating 504 having a plurality of fingers extending substantially perpendicular to the longitudinal length of the waveguide 502 may refer to the fingers of the first electrically conductive sub-wavelength grating 504 having an angle of −5° to +5° to the normal, i.e. an angle selected from a range from 85° to 95° to the length of the waveguide 502. Likewise, the second electrically conductive sub-wavelength grating 506 having a plurality of fingers extending substantially perpendicular to the longitudinal length of the waveguide 502 may refer to the fingers of the second electrically conductive sub-wavelength grating 506 having an angle of −5° to +5° to the normal, i.e. an angle selected from a range from 85° to 95° to the length of the waveguide 502.

In various embodiments, the fingers of the first electrically conductive sub-wavelength grating 504 may be perpendicular or 90° to the longitudinal length of the waveguide 502. In various embodiments, the fingers of the second electrically conductive sub-wavelength grating 506 may be perpendicular or 90° to the longitudinal length of the waveguide 502.

A period between neighbouring fingers of the first electrically conductive sub-wavelength grating 504 may be less than a wavelength of the optical light. A period between neighbouring fingers of the second electrically conductive sub-wavelength grating 506 may be less than the wavelength of the optical light. For instance, the period between neighbouring fingers of the first electrically conductive sub-wavelength grating 504 and/or the second electrically conductive sub-wavelength grating 506 may be less than 500 nm, e.g. less than 300 nm.

In various embodiments, a material included in the waveguide 502 may be different from a material included in the first electrically conductive sub-wavelength grating 504 and the second electrically conductive sub-wavelength grating 506. In other words, the material of the waveguide 502 may be different from the material of the electrically conductive sub-wavelength gratings 504, 506. The material included in the waveguide 502 may be a dielectric with Pockels effect.

In various embodiments, an effective refractive index of the first sub-wavelength grating 504 may be less than a refractive index of the waveguide 502. An effective refractive index of the second sub-wavelength grating 506 may be less than the refractive index of the waveguide 502.

In various embodiments, waveguide may include a material selected from a group consisting of aluminium nitride (AlN), scandium doped aluminium nitride (ScAlN), lithium niobate (LiNbO$_3$), lithium tantalite (LiTaO$_3$), and crystalline silicon carbide (SiC).

The Pockels effect may change refractive index in the waveguide 502 induced by an electric field generated between the first electrically conductive sub-wavelength grating 504 and the second electrically conductive subwavelength grating 506 upon application of the potential difference between the first electrically conductive sub-wavelength grating 504 and the second electrically conductive sub-wavelength grating 506. The refractive index change may be proportional to the electric field.

In various embodiments, the first electrically conductive sub-wavelength grating 504 and/or the second electrically conductive sub-wavelength grating 506 may include doped polysilicon.

In various embodiments, the electro-optic modulator may also include a first cladding layer such that the first electrically conductive sub-wavelength grating 504 is embedded in the first cladding layer, e.g. a first silicon oxide layer such that the first electrically conductive sub-wavelength grating 504 is embedded in the first silicon oxide layer. The electro-optic modulator may further include a second cladding layer such that the second electrically conductive sub-wavelength grating 506 is embedded in the second cladding layer, e.g. a second silicon oxide layer such that the second electrically conductive sub-wavelength grating is embedded in the second silicon oxide layer.

In various embodiments, the first electrically conductive sub-wavelength grating 504 may be over a substrate, the waveguide 502 is over the first sub-wavelength grating 504, and the second electrically conductive sub-wavelength grating 506 may be over the waveguide 502, such that first sub-wavelength grating 504, the waveguide 502 and the second electrically conductive sub-wavelength grating 506 form a vertical arrangement over the substrate. In various embodiments, the electro-optic modulator may include the substrate.

In various embodiments, the optical light may include a wavelength selected from a range from 1330 nm to 1550 nm.

In various embodiments, the electro-optic modulator may be a push-pull Mach-Zehner interferometer (MZI) modulator or a ring modulator.

As highlighted above, one problem of conventional AlN electro-optic (EO) modulator is that the electrode (metal or doped polysilicon) need be placed far away from the AlN waveguide to avoid optical loss, which results in lower modulation efficiency.

In order to place the electrode near the waveguide, the electrode would need to meet the following criteria: (1) lower refractive index than the waveguide material; and (2) negligible optical loss for the operating wavelength. Unfortunately, there is no such suitable material.

Various embodiments may seek to address this problem by using doped polysilicon sub-wavelength gratings. Although the refractive index of polysilicon is much larger than AlN, the effective index of the doped polysilicon sub-wavelength grating may be lower than that of AlN. Meanwhile, the grating may keep optical loss low for operations at 1330 nm to 1550 nm wavelengths.

Figure 6:
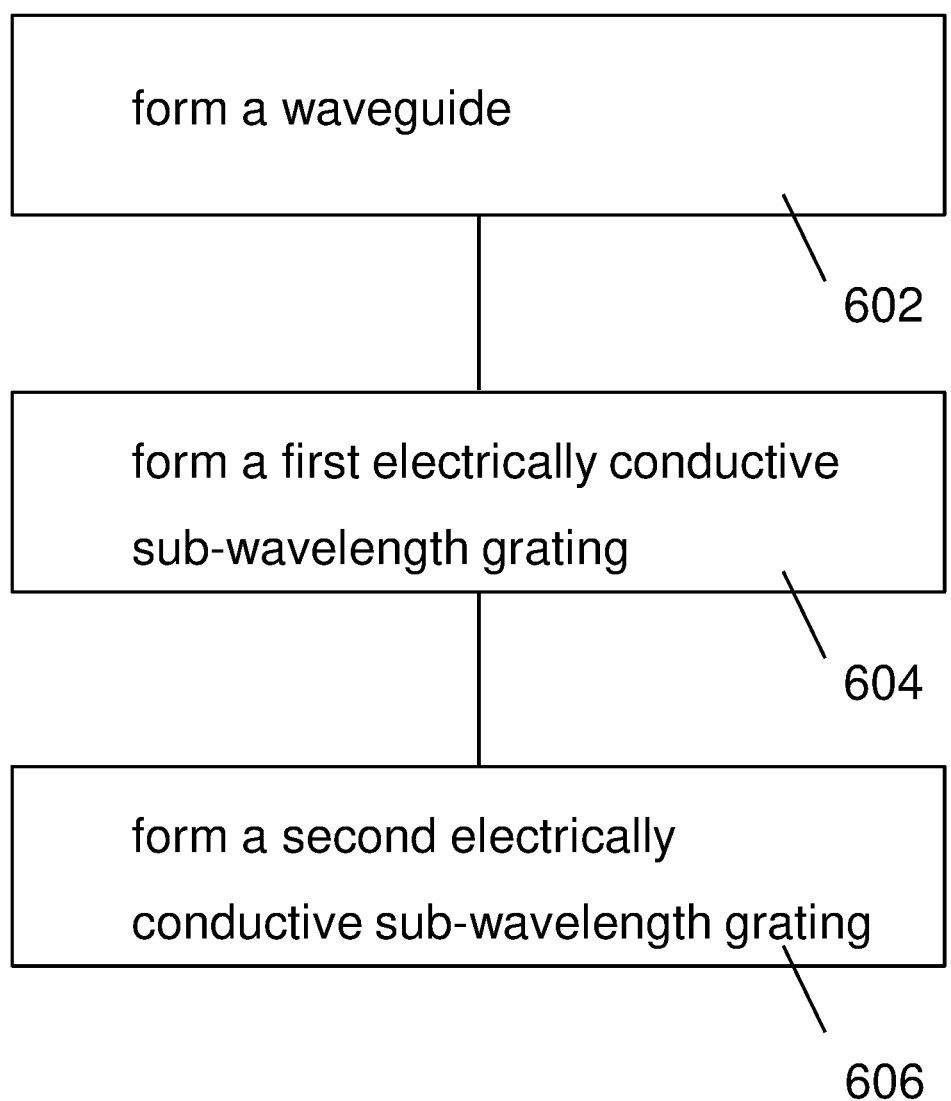
FIG. 6 is a general illustration of a method of forming an electro-optic modulator according to various embodiments.

FIG. 6 is a general illustration of a method of forming an electro-optic modulator according to various embodiments. The method may include, in 602, forming a waveguide configured to carry optical light along a longitudinal length of the waveguide. The method may also include, in 604, forming a first electrically conductive sub-wavelength grating on or in contact with a first side of the waveguide, the first electrically conductive sub-wavelength grating including a plurality of fingers extending substantially perpendicular to the longitudinal length of the waveguide. The method may further include, in 606, forming a second electrically conductive sub-wavelength grating on or in contact with a second side of the waveguide opposite the first side, the second electrically conductive sub-wavelength grating including a plurality of fingers extending substantially perpendicular to the longitudinal length of the waveguide. The electro-optic modulator may be configured to modulate the optical light upon application of a potential difference between the first electrically conductive sub-wavelength grating and the second electrically conductive sub-wavelength grating based on Pockels effect.

In other words, the method may include forming the waveguide, the first electrode (i.e. the first electrically conductive sub-wavelength grating) and the second electrode (i.e. the second electrically conductive sub-wavelength grating).

For avoidance of doubt, FIG. 6 is not intended to limit the sequence of the steps. For instance, in various embodiments, step 604 may occur before step 602, at the same time as step 602, or after step 602.

In various embodiments, the first electrically conductive sub-wavelength grating may be formed over a substrate. The waveguide may be formed over the first electrically conductive sub-wavelength grating after forming the first electrically conductive sub-wavelength grating. The second electrically conductive sub-wavelength grating may be formed over the waveguide after forming the waveguide.

In various embodiments, forming the waveguide may include depositing aluminium nitride (AlN) or scandium doped aluminium nitride (ScAlN) via chemical vapor deposition (CVD) or physical vapor deposition (PVD).

In various embodiments, forming the first electrically conductive sub-wavelength grating and/or forming the second electrically conductive sub-wavelength grating may include depositing polysilicon via chemical vapor deposition or physical vapor deposition, patterning the deposited polysilicon, and doping the patterned polysilicon via ion implantation.

In various embodiments, the method may additionally include annealing after forming the second electrically conductive sub-wavelength grating.

In various embodiments, the method may further include depositing silicon oxide between the fingers of the first electrically conductive sub-wavelength grating after forming the first electrically conductive sub-wavelength grating. The method may also include depositing silicon oxide between the fingers of the second electrically conductive sub-wavelength grating after forming the second electrically conductive sub-wavelength grating.

In various embodiments, the method may also include forming a first metal via to electrically connect to the first electrically conductive sub-wavelength grating and a second metal via to electrically connect to the second electrically conductive sub-wavelength grating after forming the first electrically conductive sub-wavelength grating and the second electrically conductive sub-wavelength grating.

In various embodiments, an effective refractive index of the first sub-wavelength grating may be less than a refractive index of the waveguide. An effective refractive index of the second sub-wavelength grating may be less than the refractive index of the waveguide.

In various embodiments, a period between neighbouring fingers of the first electrically conductive sub-wavelength grating may be less than a wavelength of the optical light. A period between neighbouring fingers of the second electrically conductive sub-wavelength grating may be less than the wavelength of the optical light.

In various embodiments, the electro-optic modulator may be a push-pull Mach-Zehner interferometer (MZI) modulator or a ring modulator.

Various embodiments may relate to using a metamaterial, i.e., doped polysilicon with subwavelength grating (SWG) structure, as the electrode of the EO modulator.

Figure 7A:
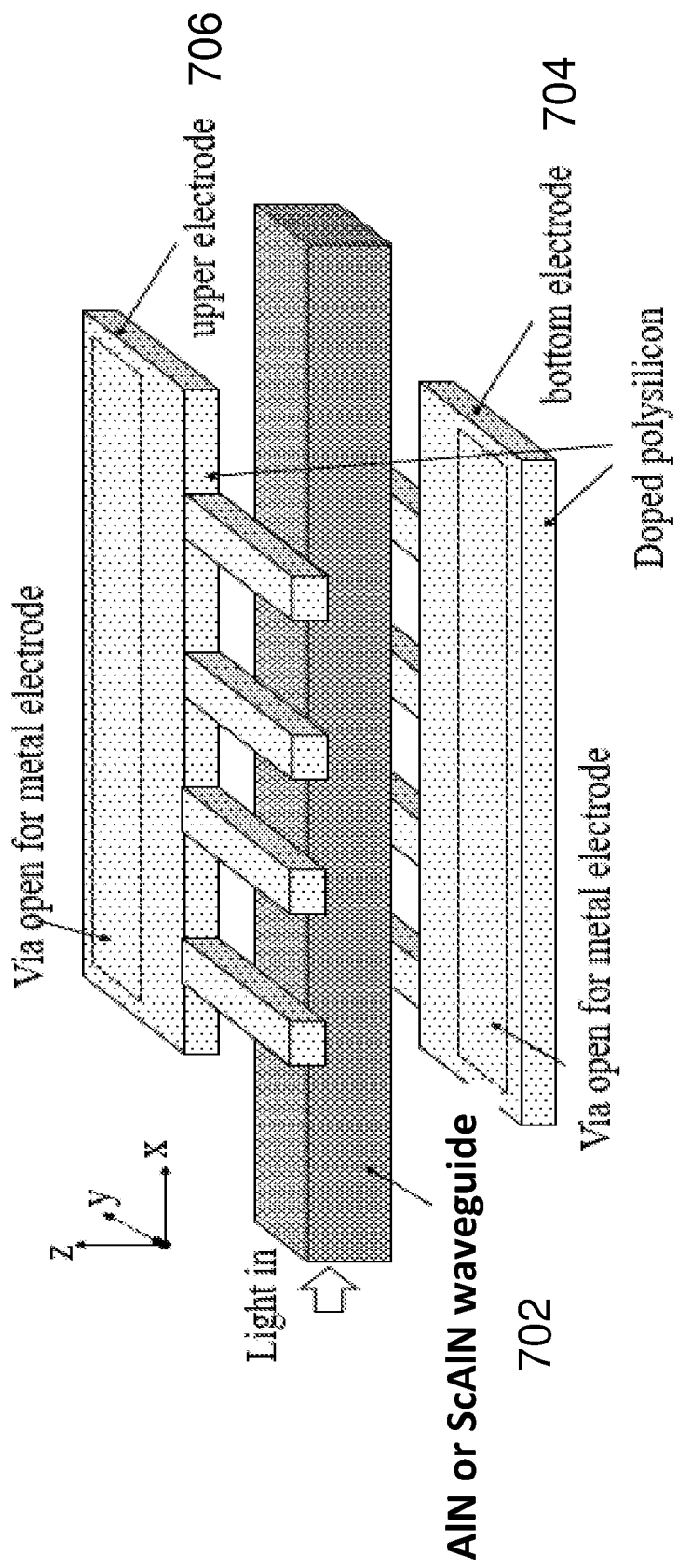
FIG. 7A is a perspective three-dimensional (3D) view of the electro-optic modulator according to various embodiments.
Figure 7B:
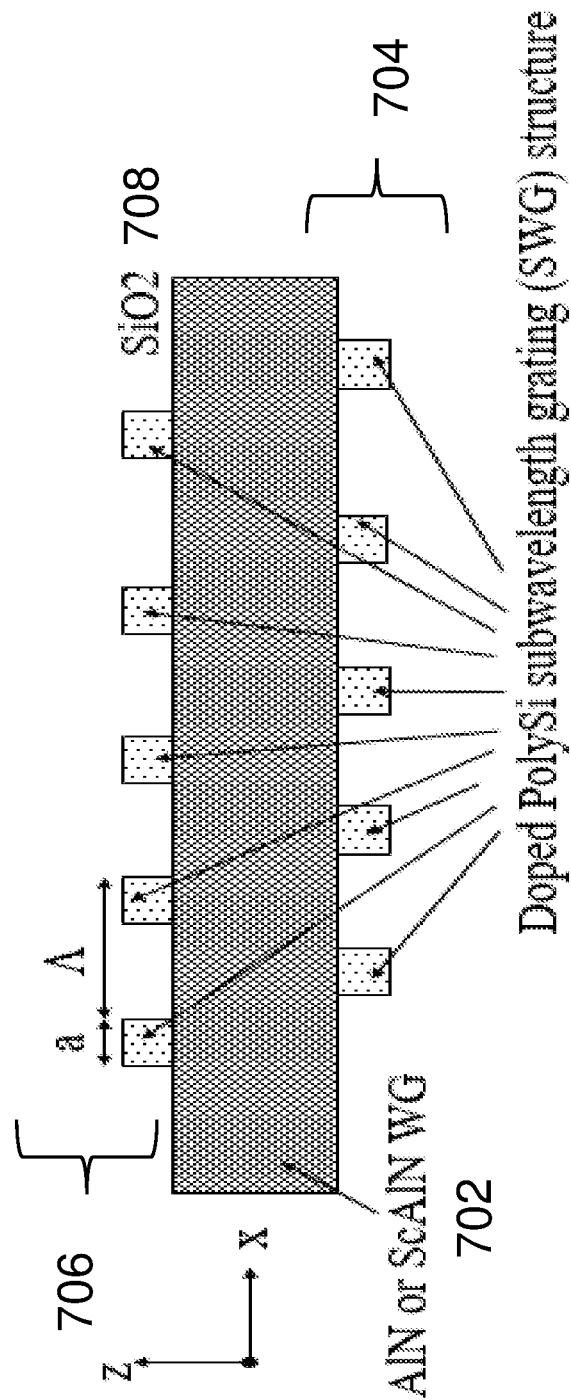
FIG. 7B is a cross-sectional view (across the X-Z plane) of the electro-optic modulator according to various embodiments.

FIG. 7A is a perspective three-dimensional (3D) view of the electro-optic modulator according to various embodiments. FIG. 7B is a cross-sectional view (across the X-Z plane) of the electro-optic modulator according to various embodiments.

The electro-optic modulator may include a waveguide 702 configured to carry optical light along a longitudinal length of the waveguide 702. The electro-optic modulator may also include a first electrically conductive sub-wavelength grating 704 (i.e. the bottom electrode) on or in contact with a first side of the waveguide, the first electrically conductive sub-wavelength grating including a plurality of fingers extending substantially perpendicular to the longitudinal length of the waveguide 702. The electro-optic modulator may further include a second electrically conductive sub-wavelength grating 706 (i.e. the upper electrode) on or in contact with a second side of the waveguide 702 opposite the first side, the second electrically conductive sub-wavelength grating including a plurality of fingers extending substantially perpendicular to the longitudinal length of the waveguide 702. As shown in FIG. 7A, the fingers of the first electrically conductive sub-wavelength grating 704 and the fingers of the second electrically conductive sub-wavelength grating 706 may extend inwards. The fingers of the first electrically conductive sub-wavelength grating 704 may extend towards below the waveguide 702, while the fingers of the second electrically conductive sub-wavelength grating 706 may extend towards above the waveguide 702. The first electrically conductive sub-wavelength grating 704 and the second electrically conductive sub-wavelength grating 706 may include doped polysilicon.

The Y-cut (X-Z plane) cross section of the modulator is shown in FIG. 7B. Each doped polysilicon (polySi) sub-wavelength grating (SWG) 704, 706 may have a width of "a" and a period of "Λ". If Λ<<λ, i.e., in the subwavelength regime, the optical property of the SWG structure may behave as a homogenous medium and the equivalent refractive index ($n_{SWG}$) may be given as:

$$n_{SWG}^2 = \frac{a}{\Lambda} n_1^2 + \left(1 - \frac{a}{\Lambda}\right) n_2^2 \quad (8)$$

where $n_1$ is the doped polysilicon refractive index: $n_1 = \sim 3.5$; and $n_2$ is the $SiO_2$ refractive index: $n_2 = 1.45$. The value of a and Λ should be selected to fulfil the criteria of:

$$\Lambda << \lambda \quad (9)$$

$$n_{SWG} < n_{AlN} \ (n_{AlN} \sim 2.1, \text{ and } n_{ScAlN} \sim 2.2) \quad (10)$$

In the case of a=50 nm and Λ=300 nm, then $n_{SWG}$=1.93, which is smaller than that of the waveguide, i.e., AlN or ScAlN.

The first electrically conductive sub-wavelength grating 704 and the second electrically conductive sub-wavelength grating 706 may be embedded in silicon oxide ($SiO_2$) layers 708.

Figure 7C:
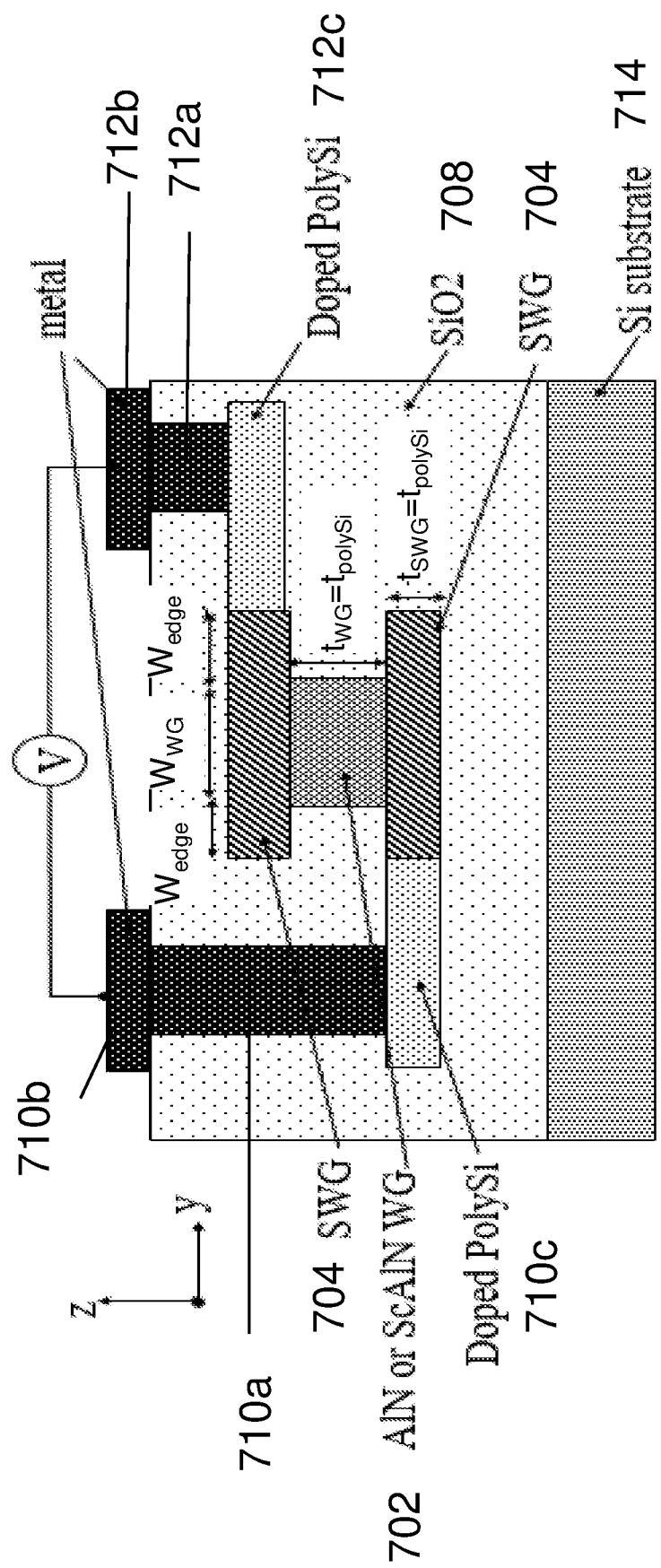
FIG. 7C is a cross-sectional view (across the Y-Z plane) of the electro-optic modulator according to various embodiments.

FIG. 7C is a cross-sectional view (across the Y-Z plane) of the electro-optic modulator according to various embodiments. In the X-cut (Y-Z plane) cross section as shown in FIG. 7C, the modulator may further include a first metal via 710a for electrical connection with the first electrically conductive sub-wavelength grating 704, and a second metal via 712a for electrical connection with the second electrically conductive sub-wavelength grating 706. The modulator may also include a first metal pad 710b in electrical connection with the first metal via 710a, as well as a second metal pad 712b in electrical connection with the second metal via 710b. The first metal pad 710b and the second metal pad 712b may be on an exposed surface of the silicon oxide ($SiO_2$) layers 708. The modulator may additionally include a first doped polysilicon layer 710c electrically connecting the first electrically conductive sub-wavelength grating 704 and the first metal via 710a, as well as a second doped polysilicon layer 712c electrically connecting the second electrically conductive sub-wavelength grating 706 with the second metal via 712a. The first electrically conductive sub-wavelength grating 704, the waveguide 702, the second electrically conductive sub-wavelength grating 706, the metal vias 710a, 712a, the metal pads 710b, 712b, the doped polysilicon layers 710c, 712c, and the silicon oxide layers 708 may be over a substrate 714.

As shown in FIG. 7C, the width of electrically conductive sub-wavelength gratings 704, 706 may be equal to the width of the waveguide 702 ($W_{WG}$) and two edge widths ($W_{edge}$). The waveguide 702 may have a thickness $t_{WG}$. The thickness of the electrically conductive sub-wavelength gratings 704, 706 ($t_{SWG}$) may be equal to the thickness of the doped polysilicon layers 710c, 712c ($t_{polySi}$). In one example, $t_{WG}$=0.4 μm, $W_{WG}$=1.0 μm, $t_{SWG}$=$t_{polySi}$=0.1 μm; and $W_{edge}$=1.0 μm.

At 1550 nm wavelength, AlN may have a propagation loss of ~0.4 dB/cm, corresponding to its refractive index of $n_{AlN}$=2.1+i1.5e-6. The doped polysilicon (poly-Si) may have propagation loss of ~10-20 dB/cm, corresponding to its refractive index of $n_{Poly-Si}$=3.5+i4e-5. In the case that the sub-wavelength grating has a=50 nm, Λ=300 nm, then, the equivalent index of SWG is $n_{SWG}$=1.95+i1.2e-5.

Figure 8A:
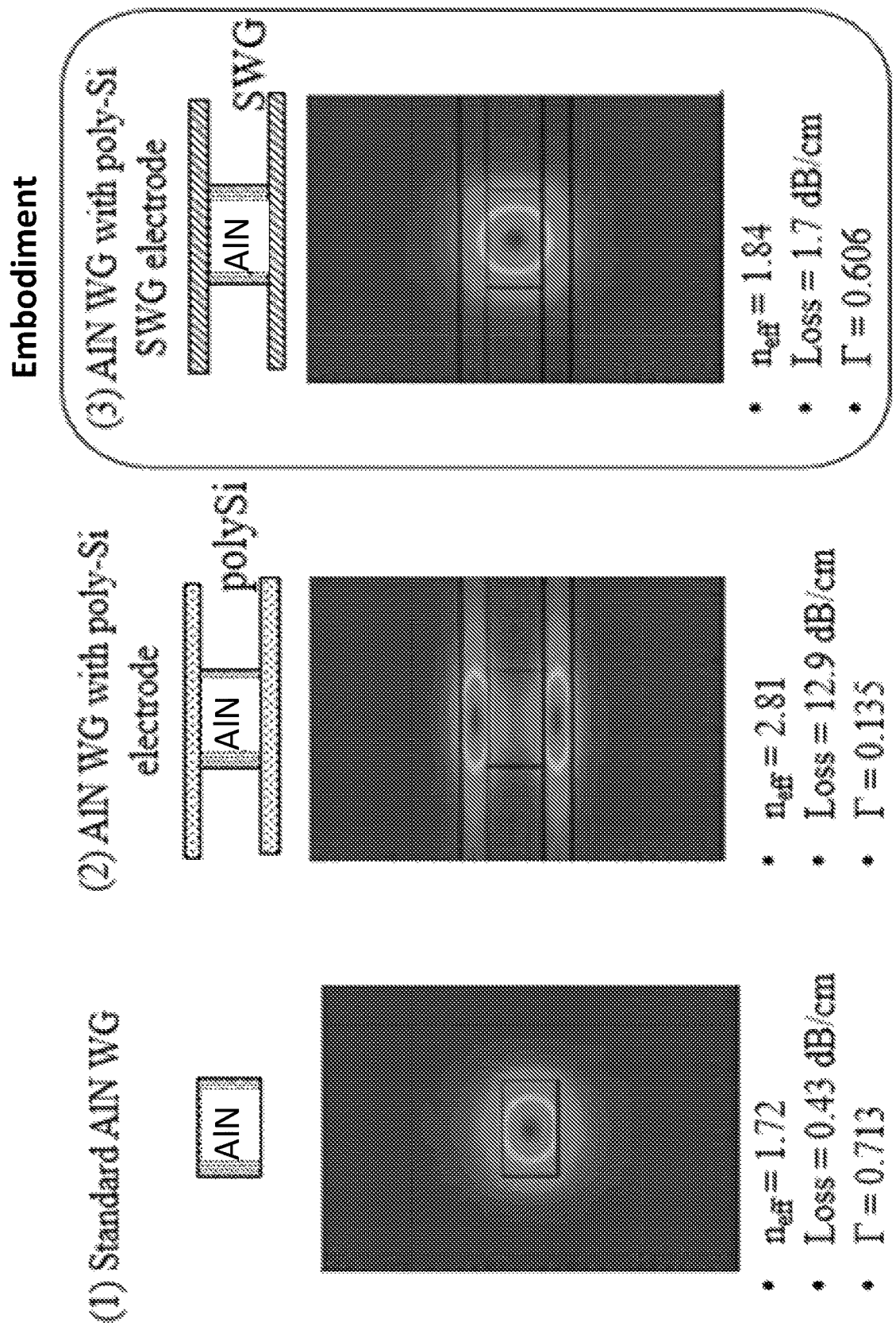
FIG. 8A compares the optical modes of (1) the conventional aluminium nitride (AlN) waveguide without electrode, (2) the conventional aluminium nitride (AlN) waveguide with continuous doped poly silicon electrode, and (3) the aluminium nitride (AlN) waveguide with the sub-wavelength grating according to various embodiments.

FIG. 8A compares the optical modes of (1) the conventional aluminium nitride (AlN) waveguide without electrode, (2) the conventional aluminium nitride (AlN) waveguide with continuous doped poly silicon electrode, and (3) the aluminium nitride (AlN) waveguide with the sub-wavelength grating according to various embodiments. The upper portion of FIG. 8A shows the schematics of (1)-(3), and the lower portion of FIG. 8A shows the corresponding images of the optical modes.

For the AlN waveguide without the electrode (or the electrode is far enough to the WG core thus no effect on the optical mode), it may have low propagation loss and the optical light is mostly confined in the waveguide core, but as abovementioned, the modulation efficiency may be very small due to large S. For the AlN WG with the normal continuous polysilicon (ploy-Si) electrode, the optical light may mostly be confined in the poly-Si electrode because of its large index and the waveguide has large loss. The continuous poly-Si electrode may change the mode significantly. Thus, this structure may not be suitable for the EO modulator. For the AlN WG with the SWG electrode according to various embodiments, the mode may be close to the AlN WG without electrode because this metamaterial has lower index than the AlN waveguide core, indicating that the poly-Si SWG can be used as electrode without sanctifying the optical mode.

Figure 8B:
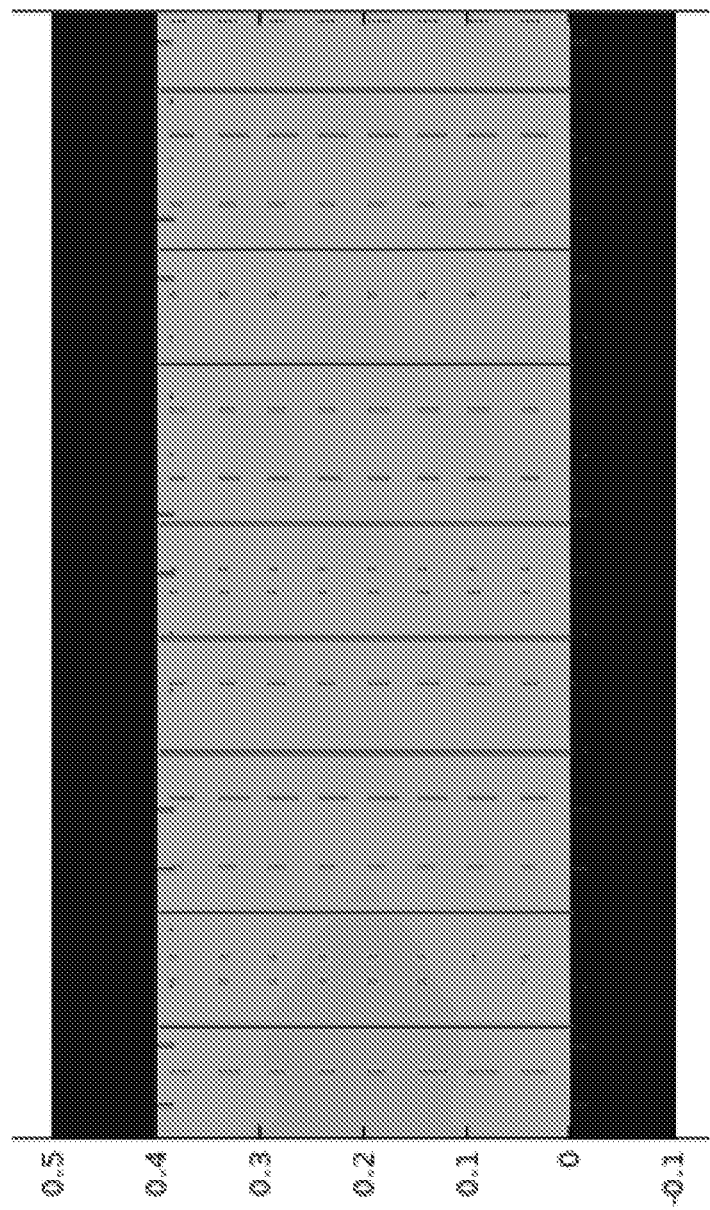
FIG. 8B shows the electric field of the conventional aluminium nitride (AlN) waveguide with continuous doped poly silicon electrode at a bias of 1V.
Figure 8C:
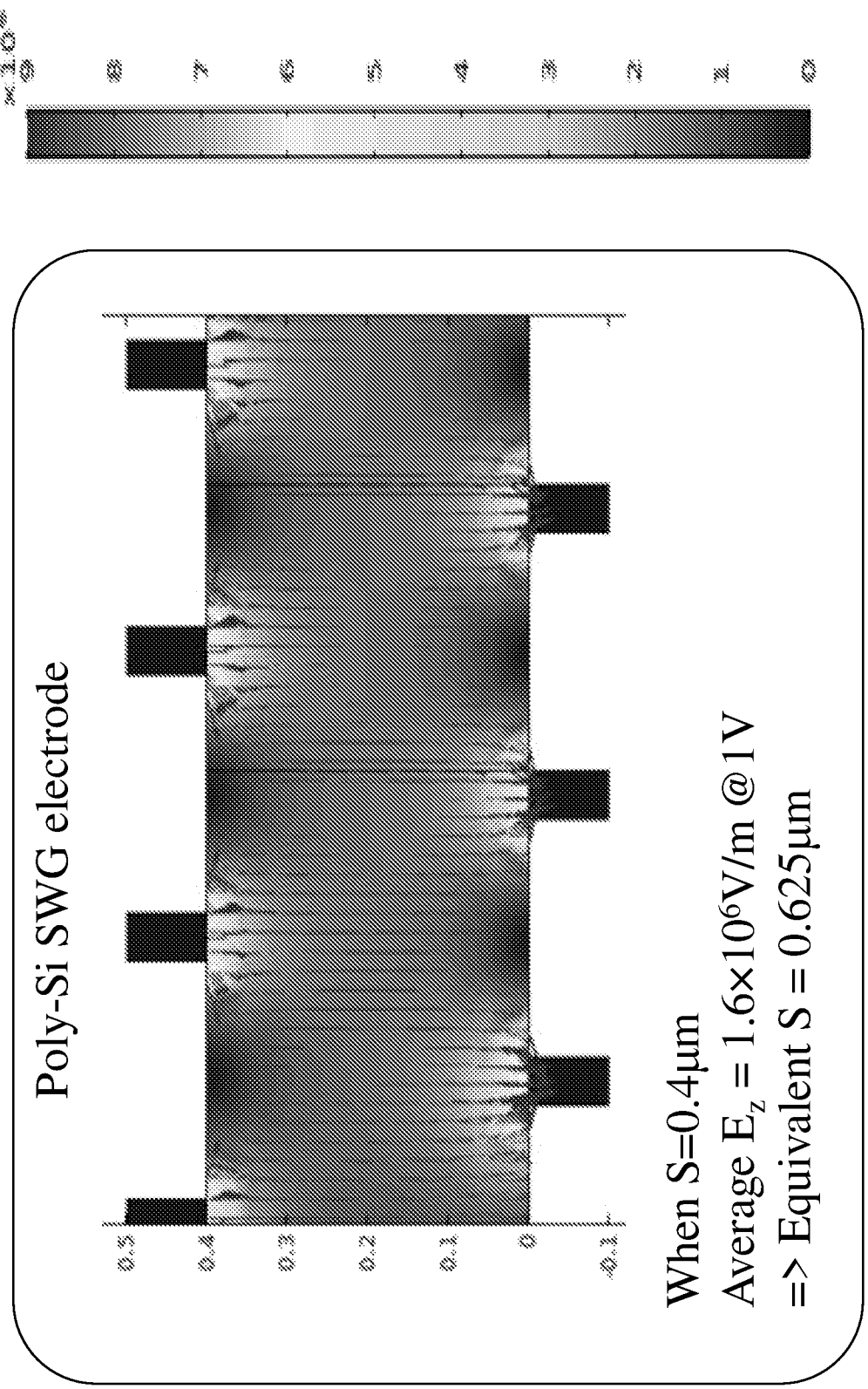
FIG. 8C shows the electric field of the aluminium nitride (AlN) waveguide with the sub-wavelength grating according to various embodiments at a bias of 1V.

FIG. 8B shows the electric field of the conventional aluminium nitride (AlN) waveguide with continuous doped poly silicon electrode at a bias of 1V. FIG. 8C shows the electric field of the aluminium nitride (AlN) waveguide with the sub-wavelength grating according to various embodiments at a bias of 1V.

The electrical simulation shows that the average $E_z$ in AlN is about $1.6 \times 10^6$ V/m at 1 V bias. For comparison, the standard plate electrode gives $2.5 \times 10^6$ V/m at 1 V bias. It indicates that the SWG electrode can function as the normal continuous poly-Si electrode. In order to maximize the average electric field in AlN, the bottom SWG and the upper SWG may be offset by $\Lambda/2$. However, the misalignment of the bottom and top SWG may only reduce the average electric field by less than 5%.

Moreover, to avoid poly-Si SWG dishing because of imperfection of chemical mechanical polishing CMP, a very thin $SiO_2$ layer (e.g. about 20 nm) may be placed between the SWG and the AlN waveguide, which corresponds to 0.1 μm equivalent length, resulting in reduction of $E_z$ by 20%.

By taking both optical and electrical properties into account, the AlN modulator with the above dimensions have a performance of waveguide loss of 1.7 dB/cm, $V_\pi \cdot L_\pi$ of ~17.2 V·cm, and 3-dB bandwidth of ~1-40 GHz measured by using optimized traveling electrode metal lines. After taking imperfect fabrication into account, $V_\pi \cdot L_\pi$ may be ~21 V·cm. This performance may be comparable to the commercial LN modulators in the market.

It is expected that ScAlN has much larger Pockels coefficient than AlN, depending on the Sc percentage. If ScAlN with $r_{33}$=10 μm/V is used, then $V_\pi \cdot L_\pi$=~1.7 V·cm, which is even better than the reported LNOI modulators. If ScAlN with $r_{33}$=5 μm/V is used, $V_\pi \cdot L_\pi$ may be equal to or more than ~3.4 V·cm.

Figure 9:
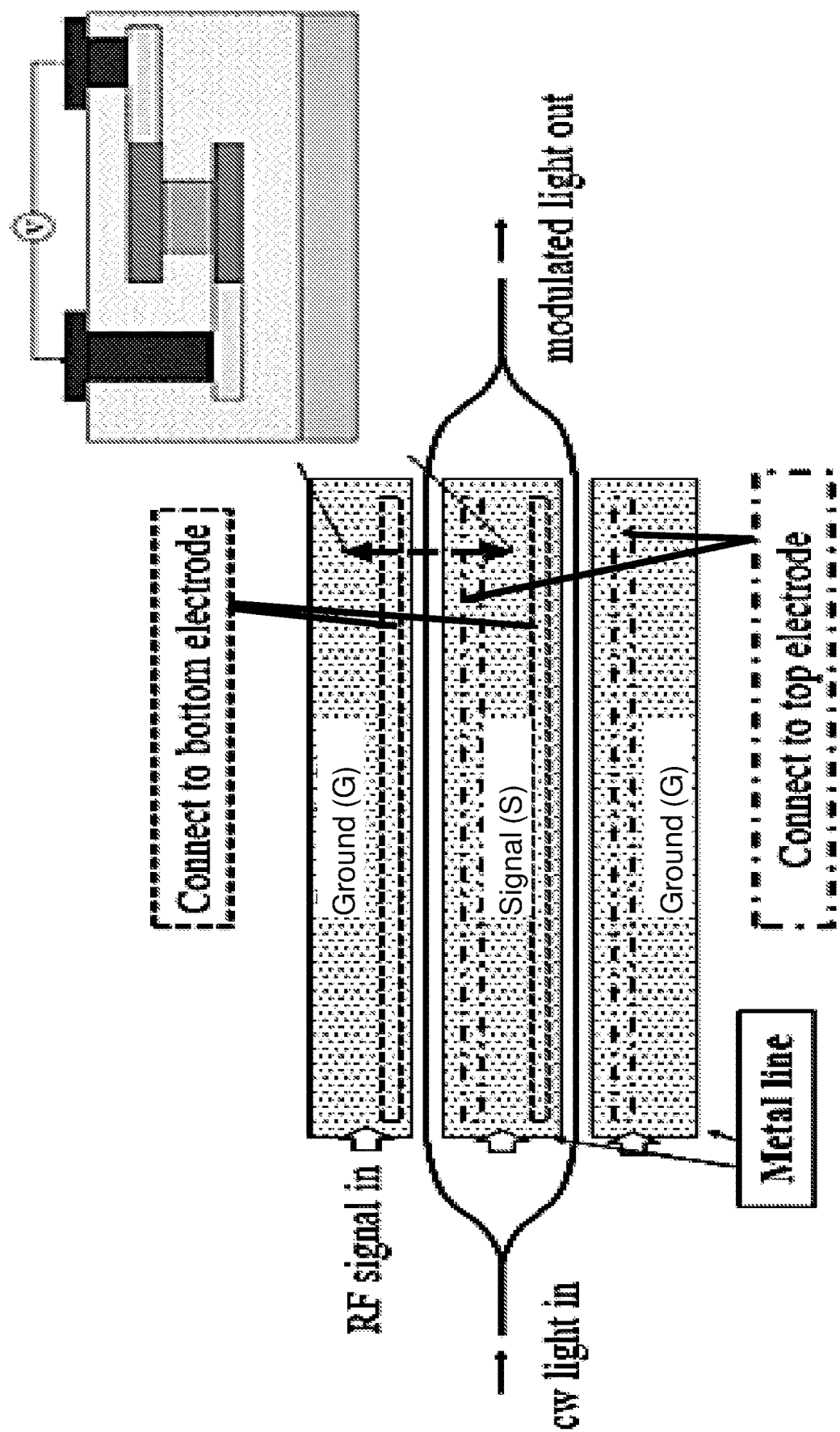
FIG. 9 shows a push-pull Mach-Zehnder interferometer (MZI) interferometer according to various embodiments.

The phase modulation may be converted to the intensity modulation by using either push-pull Mach-Zehnder interferometer or ring configurations, as shown below. FIG. 9 shows a push-pull Mach-Zehnder interferometer (MZI) modulator according to various embodiments. FIG. 9 also indicates the portion of the interferometer modulator which corresponds to the modulator as shown in FIG. 7C.

Figure 10B:
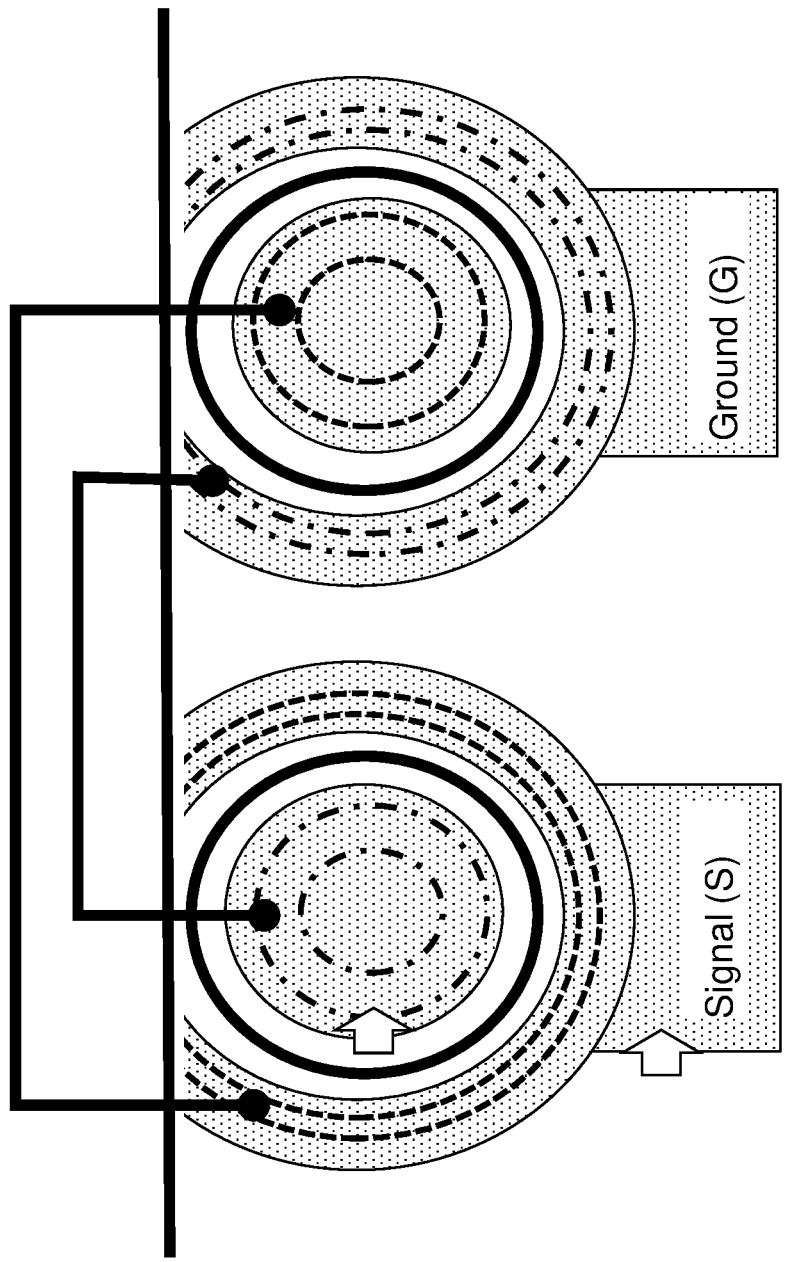
FIG. 10B shows a dual-ring ring modulator according to various embodiments.

FIG. 10A shows a single-ring ring modulator according to various embodiments. FIG. 10B shows a dual-ring ring modulator according to various embodiments.

A comparison between the performance of a conventional commercial LN modulator, a conventional LNOI modulator, a conventional reported AlN modulator, and two embodiments is shown in Table 1.

TABLE 1

Comparison of various Mach-Zehnder interferometer (MZI) electro-optic (EO) modulators

| Type | $V_\pi \cdot L_\pi$ | 3-dB bandwidth | WG Loss | Integration Feasibility | Operating Wavelength | Cost |
|---|---|---|---|---|---|---|
| Commercial LN modulator | >10 V · cm (Fujitsu, Thorlabs etc.) | 10-40 GHz | <1 dB/cm | Discrete, cannot be integrated in Si platform | Visible to near infrared (NIR): ~400 nm to ~3 μm | Expensive |
| LN on insulator modulator | 1.8-9.4 V · cm | 10-100 GHz | 0.2-1 dB/cm | Hybrid and/or heterogenous integration. Process is difficult and complex | | Very expensive |
| AlN modulator | ~240 V · cm | <1 GHZ (due to large size) | 0.4 dB/cm | Very easy in fabrication, monolithic integration on Si platform | | Very cheap |
| Embodiment based on AlN with $r_{33}$ of 1 pm/V | ~17 V · cm (theoretical) | 1-40 GHz (estimated by using traveling electrode) | 1.7 dB/cm | Very easy in fabrication, monolithic integration on Si platform | NIR > 1.1 μm to ~3 μm | Very cheap |
| Embodiment based on ScAlN with larger r33 of 10 pm/V | ~1.7 V · cm (theoretical) | 1-100 GHz (estimated by using traveling electrode) | >2 dB/cm (to be developed) | | | Very cheap |

Figure 11A:
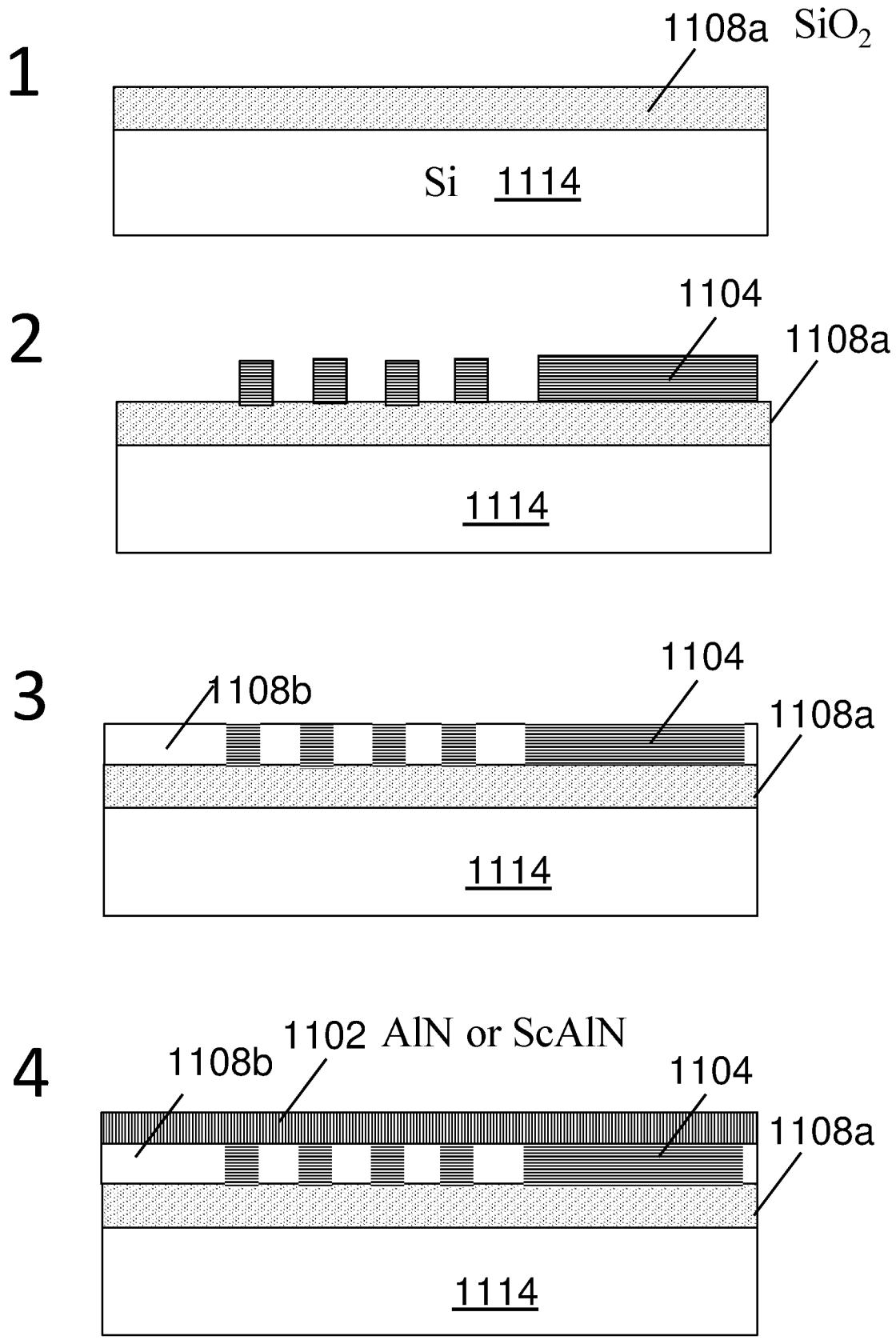
FIG. 11A shows steps 1 to 4 of forming the electro-optic modulator according to various embodiments.
Figure 11B:
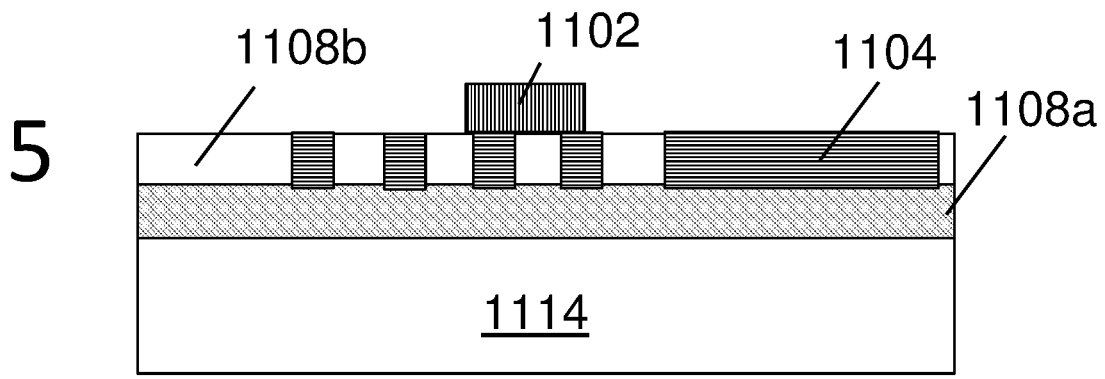
FIG. 11B shows steps 5 to 7 of forming the electro-optic modulator according to various embodiments.
Figure 11B:
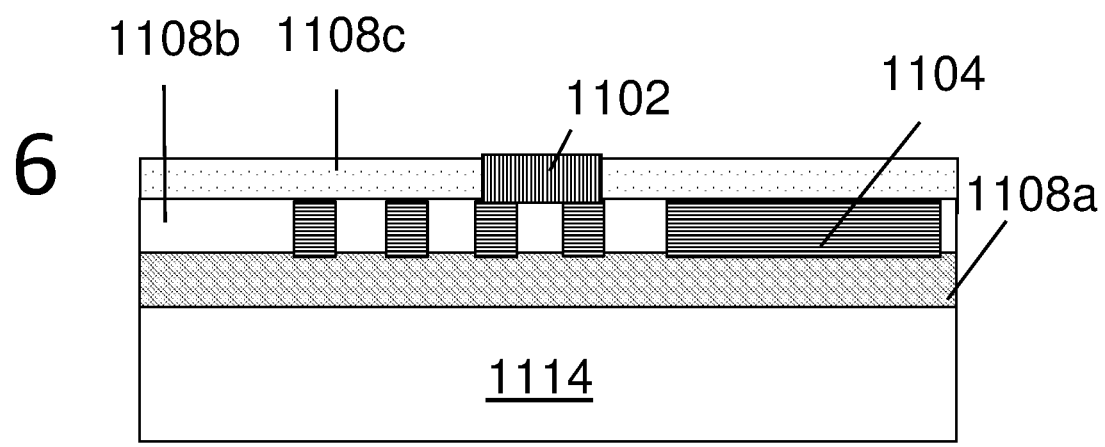
Figure 11B:
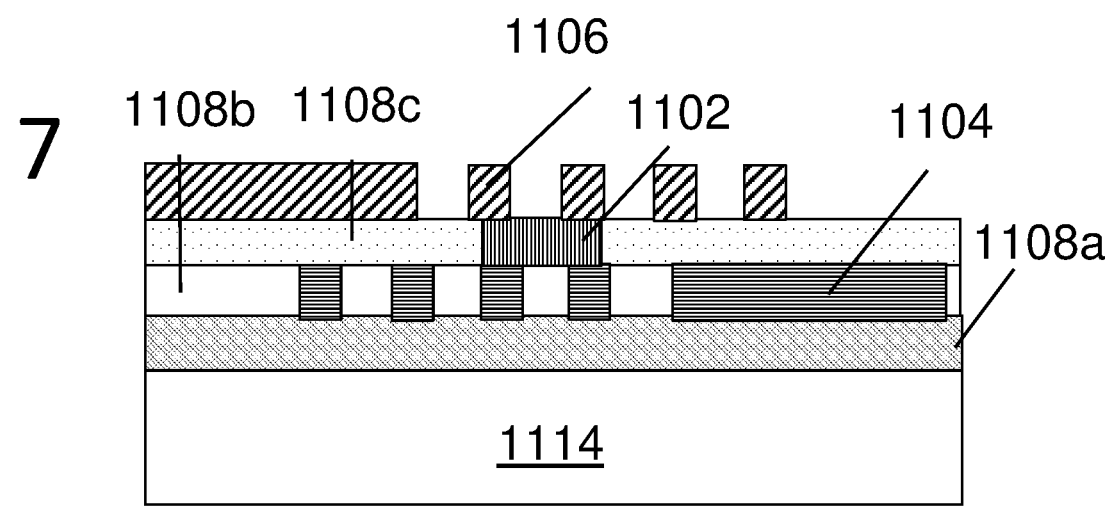
Figure 11C:
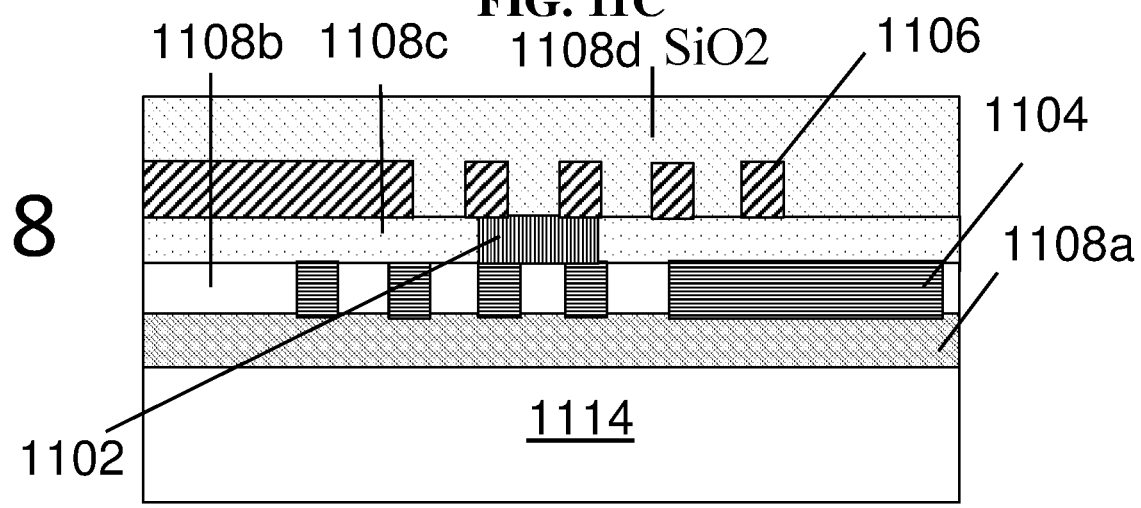
FIG. 11C shows steps 8 to 10 of forming the electro-optic modulator according to various embodiments.
Figure 11C:
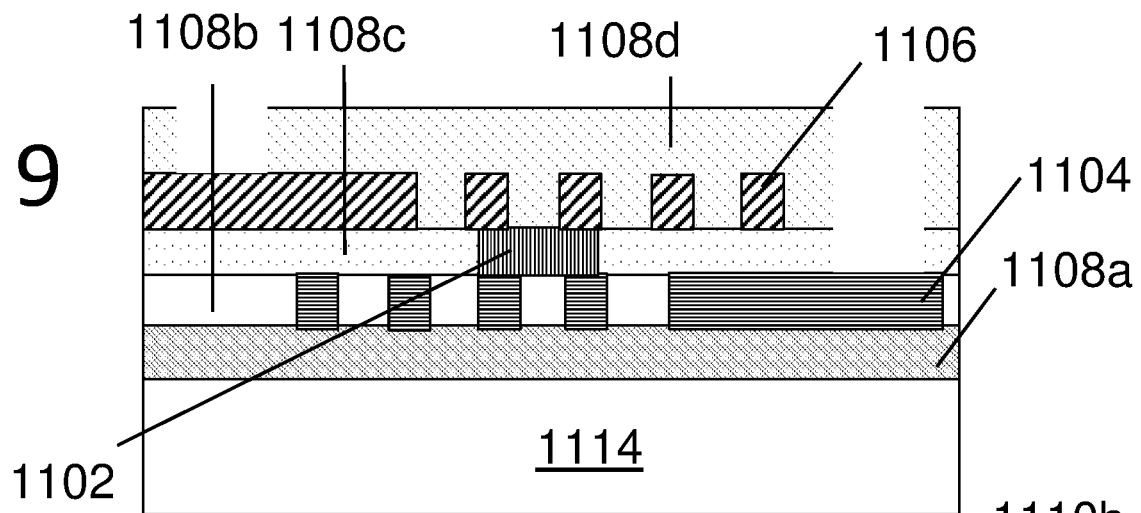
Figure 11C:
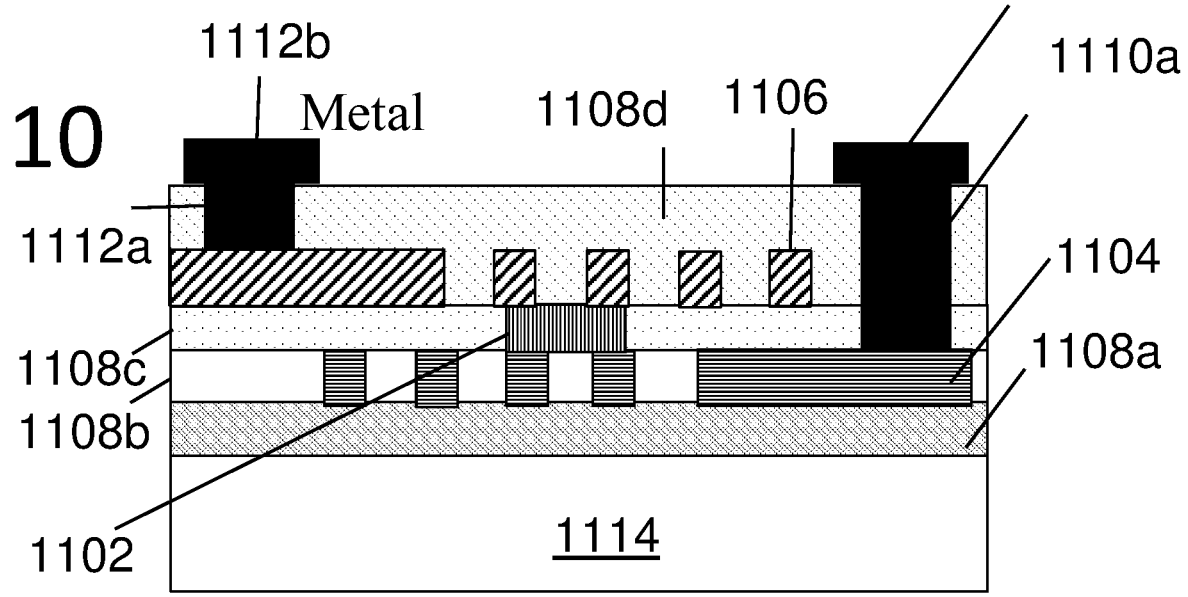

FIGS. 11A-C show a method of forming an electro-optic modulator. FIG. 11A shows steps 1 to 4 of forming the electro-optic modulator according to various embodiments. In Step 1, a silicon substrate 1114 may be covered with a layer of silicon oxide 1108a. In Step 2, polysilicon may be deposited and patterned, followed by ion implantation (~1×$10^{20}$ $cm^{-3}$) to form the first electrically conductive sub-wavelength grating 1104. In Step 3, silicon oxide may be deposited, followed by chemical mechanical polishing to form silicon oxide layer 1108b. In Step 4, AlN or ScAlN may be deposited to form waveguide layer 1102.

FIG. 11B shows steps 5 to 7 of forming the electro-optic modulator according to various embodiments. In Step 5, the waveguide layer 1102 may be patterned. In Step 6, silicon oxide may be deposited, followed by chemical mechanical polishing to form silicon oxide layer 1108c. In Step 7, polysilicon may be deposited, patterned, followed by ion implantation (~1×$10^{20}$ $cm^{-3}$). The structure may be annealed to activate the dopants and to improve AlN or ScAlN crystallization. The deposited polysilicon may form the second electrically conductive sub-wavelength grating 1106.

FIG. 11C shows steps 8 to 10 of forming the electro-optic modulator according to various embodiments. In Step 8, silicon oxide may be deposited, followed by chemical mechanical polishing to form silicon oxide layer 1108d. In Step 9, a first via may be opened to expose the bottom electrode 1104, and a second via may be opened to expose the upper electrode 1106. The vias may be opened by etching portions of the overlying layers. In Step 10, a metal, e.g. aluminum, may be deposited and patterned to form metal vias 1110a, 1112a as well as metal pads 1110b, 1112b.

Various embodiments may relate to an EO modulator using CMOS compatible deposited EO material such as AlN and/or ScAlN. Various embodiments may include doped silicon subwavelength gratings as electrodes. The modulator may be very cheap and can be monolithically integrated on Si platform with other components. Its performance may be comparable to that of the conventional $LiNbO_3$ modulator, which has larger Pockels coefficient but is not suitable for monolithic integration. Various embodiments may relate to pull-push MZI and ring modulators using the described phase modulation structure. Various embodiments may relate to a fabrication method of the described modulator.

Various embodiments can be used to fabricate a very low cost EO modulator to replace the existing commercial $LiNbO_3$ EO modulator in the market. Various embodiments can be monolithically integrated in Si platform to fabricate various photonic integrated circuits (PICs).

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. An electro-optic modulator comprising:
    a waveguide, the waveguide comprising aluminum nitride, configured to carry optical light along a longitudinal length of the waveguide;
    a first electrically conductive sub-wavelength grating on a first side of the waveguide, the first electrically conductive sub-wavelength grating comprising a plurality of fingers, the plurality of fingers comprising doped polysilicon having a refractive index larger than a refractive index of the aluminum nitride of the waveguide, extending substantially perpendicular to the longitudinal length of the waveguide; and
    a second electrically conductive sub-wavelength grating on a second side of the waveguide opposite the first side, the second electrically conductive sub-wavelength grating comprising a plurality of fingers, the plurality of fingers comprising doped polysilicon having the refractive index larger than the refractive index of the aluminum nitride of the waveguide, extending substantially perpendicular to the longitudinal length of the waveguide;
    wherein the electro-optic modulator comprises a first silicon oxide layer comprising silicon oxide between the plurality of fingers of the first electrically conductive sub-wavelength grating such that an effective refractive index of the first electrically conductive sub-wavelength grating is less than the refractive index of the aluminium nitride of the waveguide;
    wherein the electro-optic modulator comprises a second silicon oxide layer comprising silicon oxide between the plurality of fingers of the second electrically conductive sub-wavelength grating such that an effective refractive index of the second electrically conductive sub-wavelength grating is less than the refractive index of the aluminium nitride of the waveguide; and
    wherein the electro-optic modulator is configured to modulate the optical light upon application of a potential difference between the first electrically conductive sub-wavelength grating and the second electrically conductive sub-wavelength grating based on Pockels effect.

2. The electro-optic modulator according to claim 1, wherein the first electrically conductive sub-wavelength grating is over a substrate, the waveguide is over the first sub-wavelength grating, and the second electrically conductive sub-wavelength grating is over the waveguide, such that first sub-wavelength grating, the waveguide and the second electrically conductive sub-wavelength grating form a vertical arrangement over the substrate.

3. The electro-optic modulator according to claim 1, wherein a period between neighbouring fingers of the first electrically conductive sub-wavelength grating is less than a wavelength of the optical light; and
wherein a period between neighbouring fingers of the second electrically conductive sub-wavelength grating is less than the wavelength of the optical light.

4. The electro-optic modulator according to claim 1,
wherein the optical light comprises a wavelength selected from a range from 1330 nm to 1550 nm.

5. The electro-optic modulator according to claim 1,
wherein the electro-optic modulator is a push-pull Mach-Zehner interferometer (MZI) modulator or a ring modulator.

6. A method of forming an electro-optic modulator, the method comprising:
forming a waveguide, the waveguide comprising aluminum nitride, configured to carry optical light along a longitudinal length of the waveguide;
forming a first electrically conductive sub-wavelength grating on a first side of the waveguide, the first electrically conductive sub-wavelength grating comprising a plurality of fingers, the plurality of fingers comprising doped polysilicon having a refractive index larger than a refractive index of the aluminum nitride of the waveguide, extending substantially perpendicular to the longitudinal length of the waveguide; and
forming a second electrically conductive sub-wavelength grating on a second side of the waveguide opposite the first side, the second electrically conductive sub-wavelength grating comprising a plurality of fingers, the plurality of fingers comprising doped polysilicon having the refractive index larger than the refractive index of the aluminum nitride of the waveguide, extending substantially perpendicular to the longitudinal length of the waveguide;
wherein the electro-optic modulator comprises a first silicon oxide layer comprising between the plurality of fingers of the first electrically conductive sub-wavelength grating such that an effective refractive index of the first electrically conductive sub-wavelength grating is less than the refractive index of the aluminium nitride of the waveguide;
wherein the electro-optic modulator comprises a second silicon oxide layer comprising between the plurality of fingers of the second electrically conductive sub-wavelength grating such that an effective refractive index of the second electrically conductive sub-wavelength grating is less than the refractive index of the aluminium nitride of the waveguide; and
wherein the electro-optic modulator is configured to modulate the optical light upon application of a potential difference between the first electrically conductive sub-wavelength grating and the second electrically conductive sub-wavelength grating based on Pockels effect.

7. The method according to claim 6,
wherein the first electrically conductive sub-wavelength grating is formed over a substrate;
wherein the waveguide is formed over the first electrically conductive sub-wavelength grating after forming the first electrically conductive sub-wavelength grating; and
wherein the second electrically conductive sub-wavelength grating is formed over the waveguide after forming the waveguide.

8. The method according to claim 6,
wherein forming the waveguide comprises depositing aluminum nitride via chemical vapor deposition or physical vapor deposition.

9. The method according to claim 6,
wherein forming the first electrically conductive sub-wavelength grating and forming the second electrically conductive sub-wavelength grating comprise depositing polysilicon via chemical vapor deposition or physical vapor deposition, patterning the deposited polysilicon, and doping the patterned polysilicon via ion implantation.

10. The method according to claim 9, further comprising:
annealing after forming the second electrically conductive sub-wavelength grating.

11. The method according to claim 6, further comprising:
forming a first metal via to electrically connect to the first electrically conductive sub-wavelength grating and a second metal via to electrically connect to the second electrically conductive sub-wavelength grating after forming the first electrically conductive sub-wavelength grating and the second electrically conductive sub-wavelength grating.

12. The method according to claim 6,
wherein a period between neighbouring fingers of the first electrically conductive sub-wavelength grating is less than a wavelength of the optical light; and
wherein a period between neighbouring fingers of the second electrically conductive sub-wavelength grating is less than the wavelength of the optical light.

13. The method according to claim 6,
wherein the electro-optic modulator is a push-pull Mach-Zehner interferometer (MZI) modulator or a ring modulator.

* * * * *